(12) United States Patent
Robles-Kelly et al.

(10) Patent No.: US 9,087,266 B2
(45) Date of Patent: Jul. 21, 2015

(54) ILLUMINATION SPECTRUM RECOVERY

(75) Inventors: Antonio Robles-Kelly, Kaleen (AU); Cong Phuoc Huynh, Braddon (AU)

(73) Assignee: NATIONAL ICT AUSTRALIA LIMITED, Eveleigh, NSW (AU)

( * ) Notice: Subject to any disclaimer, the term of this patent is extended or adjusted under 35 U.S.C. 154(b) by 550 days.

(21) Appl. No.: 13/394,094

(22) PCT Filed: Aug. 6, 2010

(86) PCT No.: PCT/AU2010/001000
§ 371 (c)(1),
(2), (4) Date: Apr. 2, 2012

(87) PCT Pub. No.: WO2011/026167
PCT Pub. Date: Mar. 10, 2011

(65) Prior Publication Data
US 2012/0183213 A1    Jul. 19, 2012

(30) Foreign Application Priority Data

Sep. 3, 2009 (AU) ................................ 2009904230
Feb. 1, 2010 (AU) ................................ 2010900383

(51) Int. Cl.
*G06K 9/46* (2006.01)
*G06K 9/00* (2006.01)
*G06T 7/40* (2006.01)

(52) U.S. Cl.
CPC .......... *G06K 9/4661* (2013.01); *G06K 9/00362* (2013.01); *G06T 7/408* (2013.01); *G06T 2207/10024* (2013.01); *G06T 2207/20021* (2013.01); *G06T 2207/30201* (2013.01)

(58) Field of Classification Search
USPC .................. 382/100, 165, 207–207, 260, 523
See application file for complete search history.

(56) References Cited

U.S. PATENT DOCUMENTS

| 7,068,840 | B2 | 6/2006 | Risson |
| 7,203,362 | B2 | 4/2007 | Sato et al. |
| 7,319,467 | B2 | 1/2008 | Weyrich et al. |
| 2007/0132759 | A1 | 6/2007 | Mallick et al. |

FOREIGN PATENT DOCUMENTS

WO    2007/089624    8/2007

OTHER PUBLICATIONS

Horn; B.K.P. "Robot Vision: Reflectance Map: Photometric Stereo," MIT Press; pp. 203-211; Cambridge; Massachusetts; 1986.
Huber; "The Basic Types of Estimates" P.1. Robust Statistics; Wiley-Interscience pp. 43-107; 1981.
(Continued)

Primary Examiner — Duy M Dang

(57) ABSTRACT

The disclosure concerns processing of electronic images, such as hyperspectral or multispectral images. Processing of the images includes object recognition and image enhancement in a way that harnesses the information available from the image based on the wavelength indexed spectral data these types of images provide. Illumination spectrum of such an image is estimated (FIG. 21) using a cost function based on a dichromatic reflection model and a constraint term. This method may be performed on sub-images of the image. A method for selecting these sub-images (FIG. 23) is also disclosed. A method of determining photometric parameters of the image given the estimated illumination spectrum (FIG. 22) is also disclosed.

30 Claims, 12 Drawing Sheets

$\mathbf{I}(u)$ : the spectral radiance vector at image pixel $u$, $\mathbf{I}(u) = [I(\lambda_1, u), \ldots I(\lambda_n, u)]^T$ $\mathbf{L}$ : the spectral power vector of the illuminant, $\mathbf{L} = [L(\lambda_1), \ldots L(\lambda_n)]^T$ $\mathbf{S}_P$ : the common spectral reflectance vector for each patch $P$, $\mathbf{S}_P = [S_P(\lambda_1), \ldots S_P(\lambda_n)]^T$ $\mathbf{g}_P$ : the shading map of all pixels in patch $P$, $\mathbf{g}_P = [g(u_1), \ldots g(u_l)]^T$ with $u_1, \ldots u_l$ being all the pixels in the patch $P$ $\mathbf{g}$ : the shading map of all the patches, $\mathbf{g} = [\mathbf{g}_{P_1}, \ldots \mathbf{g}_{P_r}]^T$ where $P_1, \ldots P_r$ are all patches in $\mathcal{P}$ $\mathbf{k}_P$ : the specularity map of all pixels in patch $P$, $\mathbf{k}_P = [k(u_1), \ldots k(u_l)]^T$ $\mathbf{k}$ : the specularity map of all the patches, $\mathbf{k} = [\mathbf{k}_{P_1}, \ldots \mathbf{k}_{P_r}]^T$

(56) References Cited

OTHER PUBLICATIONS

Hoaglin, D.C et al.; "Understanding Robust and Exploratory Data Analysis: M-Estimators of Location: An Outline of the Theory" Wiley-Interscience; pp. 339-399; 2000.
Cie. Commision Internationale de l'Eclairage Proceedings; "The Colorimetric Properties of the Spectrum" Cambridge University Press; Cambridge; pp. 149-164; 1932.
Barnard, K. et al.; "A Comparison of Computational Color Constancy Algorithms Part II: Experiments With Image Data"; IEEE Transactions on Image Processing II vol. 9; pp. 985-996; 2002.
Barnard et al.; "A Data Set for Color Research"; Color Research and Application 27, 3; pp. 147-151; Mar. 27, 2002.
Forsyth, D.; A Novel Algorithm for Color Constancy; International Journal of Computer Vision 5, pp. 5-24; 1990.
Klinker, G. et al.; "A Physical Approach to Color Image Understanding"; International Journal of Computer Vision 4; pp. 7-38; 1990.
Brainard, D. et al.; "Analysis of the retinex theory of color vison"; Journal of Optical Society America A3; pp. 1651-1661; 1986.
Tominaga, S. et al.; "Component estimation of surface spectral reflectance"; Journal of the Optical Society of America A7, 2; pp. 312-317; Feb. 1990.
Finlayson, G. et al.; "Convex and Non-convex Illuminant Constraints for Dichromatic Colour Constancy"; CVPR 1; pp. 598-604; 2001.
Boyd, S. et al.; "Convex Optimization"; Cambridge University Press; 2004.
Ferrie, F. et al.; "Curvature Consistency Improves Local Shading Anaylysis"; CVGIP: Image Understanding 55; pp. 70-76; 1992.
Sunshine et al.; "Deconvolution of Mineral Absorption Bands: An Improved Approach"; Journal of Geophysical Research 95, B5; pp. 6955-6966; May 10, 1990.
Li, S. et al.; "Discontinuous MRF prior and robust statistics: a comparative study"; Image Vision Computing vol. 13 No. 3; pp. 227-233; Apr. 3, 1995.
Healey, G.; "Estimating spectral reflectance using highligths"; Image and Vision Computing vol. 9 No. 5; pp. 333-337; Oct. 1991.
Ragheb, H. et al.; "Highlight Removal Using Shape-from-Shading"; In European Conf. on Compo Vision; No. 2351 in LNCS, pp. 626-641, 2002.
Poggio, T. et al.; "Ill-posed Problems in Early Vision: From Computational Theory to Analogue Networks"; Tech. Rep.; Cambridge; MA; USA; pp. 303-323; 1984.
Land, E. et al.; Recent Advances in Retinex Theory; Vision Research vol. 26 No. 1; pp. 7-21; 1986.
Chang, C. et al.; "LIBSVM: A Library for Support Vector Machines"; pp. 1-38; 2001; Updated Apr. 4, 2012.
Lee, H.; "Method for computing the scene-illuminant chromaticity from specular highlights"; Journal of the Optical Society of America A: Optics, Image Science, and Vision, vol. 3, Issue 10, Oct. 1986, pp. 1694-1699.
Worthington, P. et al.; "New Constraints on Data-Closeness and Needle Map Consistency for Shape-from-Shading"; IEEE Transactions on Pattern Analysis and Machine Intelligence vol. 21 No. 12; pp. 1250-1267; Aug. 1999.
Ikeuchi, K. et al.; "Numerical Shape from Shading and Occluding Boundaries"; Artificial Intelligence 17, 1-3; pp. 141-184; Aug. 1981.
Hofmann, T. et al.; "Pairwise Data Clustering by Deterministic Annealing"; IEEE Transactions on Pattern Analysis and Machine Intelligence vol. 19; pp. 1-14; Jan. 1997.
Land, E. et al.; "Lightness and Retinex Theory"; Journal of Optical Society America vol. 61, No. 1; pp. 1-11; Jan. 1971.
Nayar, S. et al.; "Reflectance Based Object Recognition"; International Journal of Computer Vision 17, 3; pp. 219-240; 1996.
Wang, J. et al.; "Relief Texture from Specularities"; IEEE Transactions on Pattern Analysis and Machine Intelligence vol. 28 No. 3; pp. 446-457; Mar. 2006.
Tan, R. et al.; "Separating Reflection Components Based on Chromaticity and Noise Analysis"; IEEE Transactions on Pattern Analysis and Machine Intelligence vol. 26 No. 10; pp. 1373-1379; Apr. 1, 2004.

Lin, S. et al.; "Separation of Diffuse and Specular Reflection in Color Images"; Computer Vision and Pattern Recognition, IEEE Computer Society Conference on I; pp. 341-346; 2001.
Brooks, M. et al.; "Shape and Source from Shading"; In MIT AI Memo; Jul. 8, 1985.
Chang, J. et al.; "Shape from shading using graph cuts"; In Proc. of the Int. Conf. on Image Processing; pp. 3749-3757; 2008.
Phung, S. et al.; "Skin Segmentation Using Color Pixel Classification: Analysis and Comparison"; IEEE Transactions on Pattern Analysis and Machine Intelligence vol. 27; pp. 148-154; 2005.
Finlayson, G. et al.; "Solving for Colour Constancy using a Constrained Dichromatic Reflection Model"; International Journal of Computer Vision vol. 42 No. 3; pp. 127-144; 2001.
Mallick, S.; "Specularity Removal in Images and Videos: A PDE Approach"; In ECCV I; pp. 550-563; 2006.
Tomina, S. et al.; "Standard surface-reflectance model and illuminant estimation"; Journal of the Optical Society of America A 6; pp. 576-584; Apr. 1989.
Koenderink, J. et al.; "Surface shape and curvature scales"; Image Vision Computing vol. 10 No. 8; pp. 557-565; Oct. 1992.
Klinker, G. et al.; "The Measurement of Highlights in Color Images" International Journal of Computer Vision 2; pp. 7-32; 1988.
Horn, B. et al.; "The Variational Approach to Shape from Shading"; CVGIP 33, 2; pp. 1-32; 1985.
Shafer, S.; "Using Color to Separate Reflection Components"; Color Research and Applications 10, 4; pp. 210-218; 1985.
Connah, D. et al.; "Optimization of a Multispectral Imaging System"; Proceedings of the First European Conference on Colour Graphics, Imaging, and Vision; pp. 619-622; 2002.
Ho, J. et al.; "Separating a Color Signal into Illumination and Surface Reflectance Components: Theory and Applications"; IEEE Transactions on Pattern Analysis and Machine Intelligence vol. 12; No. 10, pp. 966-977; Oct. 1990.
Finlayson, G. et al.; "Solving for Colour Constancy using a Constrained Dichromatic Reflection Model"; International Journal of Computer Vision 42; pp. 127-144; Aug. 20, 2002.
Huynh, C. et al.; "Simultaneous Photometric Invariance and Shape Recovery"; IEEE 12th International Conference on Computer Vision; pp. 1757-1764; Date of Conference: Sep. 29, 2009.
Huynh, C. et al.; "Optimal Solution of the Dichromatic Model for Multispectral Photometric Invariance", Structural, Syntactic, and Statistical Pattern Recognition, Lecture Notes in Computer Science vol. 5342, 2008. pp. 382-391.
Finlayson, G. et al.; "Convex and Non-convex Illuminant Constraints for Dichromatic Colour Constancy"; Proceedings of the 2001 IEEE computer Society Conference on Computer Vision and Pattern Recognition; pp. 598-604.
Leila Essannouni, Elhassane Ibn-Elhaj, Driss Aboutajdine: *Fast cross-spectral image registration using new robust correlation*. J Real-Time Image Proc., 2006, 1:123-129.
Q. Li, N. Mitianoudis and T. Stathaki: *Spatial kernel K-harmonic means clustering for multi-spectral image segmentation*. IET Image Process., 2007, 1, (2), pp. 156-167.
Guopeng Yang, Hangye Liu, Xuchu Yu: *Hyperspectal RS image classification based on kernel methods*. Proc. SPIE 6788, MIPPR 2007: Pattern Recognition and Computer Vision, 67882O, Nov. 15, 2007, 7 pages.
Antonio Robles-Kelly, Edwin R. Hancock: *A Graph-Spectral Approach to Shape-From-Shading*. IEEE Transactions on Image Processing, vol. 13, No. 7, Jul. 2004, 15 pages.
Antonio Robles-Kelly, Edwin R. Hancock: A graph-spectral method for surface height recovery. *Pattern Recognition*. vol. 38, Issue 8, Aug. 2005, pp. 1167-1186.
Robles-Kelly, E.R Hancock: Graph-Spectral Methods for Surface Height Recovery from Gauss Maps, *Geometric Properties for Incomplete data*,vol. 31, 2006, pp. 103-122.
Maurizio Baronia, Giuseppe Barlettaa: *Digital curvature estimation for left ventricular shape analysis*. Image and Vision Computing vol. 10, Issue 7, Sep. 1992, pp. 485-494.
Cong Phuoc Huynh, Antonio Robles-Kelly: *A solution of the dichromatic model for multispectral photometric invariance*, 48 pages, 2008.

(56) References Cited

OTHER PUBLICATIONS

J. van de Weijer, Th. Gevers: *Robust optical flow from photometric invariants*, 4 pages, 2004.
Masaki Yamazaki, Yen-Wei Chen, Gang Xu: *Separation of reflection components by kernel independent component analysis*, 6 pages, Jun. 6, 2006.
Jia-Bin Huang, Chu-Song Chen: *Moving cast shadow detection using physics-based features*, pp. 2310-2317, 2009.
Christian Riess, Johannes Jordan: *A common framework for ambient illumination in the dichromatic reflectance model*, pp. 1939-1946, 2009.
R. Moreno, M. Grana, A. d'Anjou: *An image color gradient preserving color constancy*, 5 pages, 2010.
Theo Gevers, Harro Stokman: *Robust histogram construction from color invariants for object recognition*, 7 pages, 2004.
Bruce A. Maxwell, Richard M. Friedhoff, Casey A. Smith: *A bi-illuminant dichromatic reflection model for understanding images*, 8 pages, 2008.
Joost van de Weijer, Theo Gevers, Jan-Mark Geusebroek: *Edge and corner detection by photometric quasi-invariants*, pp. 625-630, Apr. 2005.
Ron Gershon, Allan D. Jepson, John K. Tsotsos: *Highlight identification using chromatic information*, pp. 161-170, 1987.
Karsten Schluns, Matthias Teschner: *Analysis of 2D color spaces for highlight elimination in 3D shape*, 5 pages, 1995.
Katja Doerschner, Dan Kersten, Paul Schrater: *Rapid classification of specular and diffuse reflection from image velocities*, 8 pages, 2011.
Javier Toro: *Dichromatic illumination estimation without pre-segmentation*, pp. 871-877, 2008.
Moreno R., etc.: *RGB colour gradient following colour constancy preservation*, 2 pages, Jun. 24, 2010.
Arthur Robert Weeks, A. Gallagher, J. Eriksson: *Detection of oranges from a color image of an orange tree*, pp. 346-357. Jul. 1999.

$I(u)$: the spectral radiance vector at image pixel $u$. $\mathbf{I}(u) = [I(\lambda_1, u), \ldots I(\lambda_n, u)]^T$ $\mathbf{L}$ : the spectral power vector of the illuminant, $\mathbf{L} = [L(\lambda_1), \ldots L(\lambda_n)]^T$ $\mathbf{S}_P$ : the common spectral reflectance vector for each patch $P$, $\mathbf{S}_P = [S_P(\lambda_1), \ldots S_P(\lambda_n)]^T$ $\mathbf{g}_P$ : the shading map of all pixels in patch $P$, $\mathbf{g}_P = [g(u_1), \ldots g(u_l)]^T$ with $u_1, \ldots u_l$ being all the pixels in the patch $P$ $\mathbf{g}$ : the shading map of all the patches, $\mathbf{g} = [\mathbf{g}_{P_1}, \ldots \mathbf{g}_{P_r}]^T$ where $P_1, \ldots P_r$ are all patches in $\mathcal{P}$ $\mathbf{k}_P$ : the specularity map of all pixels in patch $P$, $\mathbf{k}_P = [k(u_1), \ldots k(u_l)]^T$ $\mathbf{k}$ : the specularity map of all the patches, $\mathbf{k} = [\mathbf{k}_{P_1}, \ldots \mathbf{k}_{P_r}]^T$

Algorithm 1 Estimate dichromatic variables from a set of homogeneous patches

Require: Image $\mathcal{I}$ with radiance $I(\lambda, u)$ for each band $\lambda \in \{\lambda_1, \ldots \lambda_n\}$ and location $u$ and the collection of homogeneous patches $\mathcal{P}$

Ensure: $\mathbf{L}, \mathbf{S}_P, \mathbf{g}, \mathbf{k}$, where $L(.)$: the estimated illuminant spectrum.

$S_P(.)$: the diffuse reflectance of each surface patch $P$.

$g(.), k(.)$: the diffuse and specular reflection coefficients at all locations.

1: $t \leftarrow 1; \mathbf{L}^0 \leftarrow \mathbf{1}^T$
2: while true do
3:    for all $P \in \mathcal{I}$ do
4:       $[\mathbf{g}_P^t, \mathbf{k}_P^t, \mathbf{S}_P^t] \leftarrow \mathrm{argmin}_{\mathbf{g}_P, \mathbf{k}_P, \mathbf{S}_P} F(P)|_{\mathbf{L}^{t-1}}$
5:    end for
6:    $[\mathbf{L}^t] \leftarrow \mathrm{argmin}_{\mathbf{L}, \mathbf{S}_{P_1}, \ldots, \mathbf{S}_{P_r}} \sum_{P \in \mathcal{P}} F(P)|_{\mathbf{g}^t, \mathbf{k}^t}$
7:    if $\angle(\mathbf{L}^t, \mathbf{L}^{t-1}) < t_L$ then
8:       break
9:    else
10:       $t \leftarrow t + 1$
11:    end if
12: end while
13: return $\mathbf{L}^t, \mathbf{g}^t, \mathbf{k}^t, \mathbf{S}_{P_1}^t, \ldots, \mathbf{S}_{P_r}^t$

Fig. 2

Algorithm 2 Estimate the shading, specularity and reflectance of an image knowing the illuminant spectrum

Require: Image $\mathcal{I}$ with radiance $I(\lambda, u)$ for each band $\lambda \in \{\lambda_1, \ldots \lambda_n\}$
and the illuminant spectrum L

Ensure: $S_P$, g, k, where $g(u), k(u)$: the shading and specularity at pixel location $u$.

$S(\lambda, u)$: the diffuse reflectance of at pixel $u$ and wavelength $\lambda$.

1: for all $u \in \mathcal{I}$ do
2: $\quad \mathcal{N} \leftarrow$ Neighbourhood of $u$
3: $\quad [g_\mathcal{N}, k_\mathcal{N}, S_\mathcal{N}] \leftarrow \mathrm{argmin}_{g_\mathcal{N}, k_\mathcal{N}, S_\mathcal{N}} F(P)|_L$
4: $\quad S(u) \leftarrow S_\mathcal{N}$
5: end for
6: return $g(u), k(u), S(., u)$

Fig. 3

Table 1

| Estimator | Robust kernel $\rho_\sigma(\eta)$ | Influence function $\Gamma_\sigma(\eta)$ |
|---|---|---|
| Tukey | $\rho_\sigma(\eta) = \begin{cases} \sigma\left(1 - \left(1 - (\frac{\eta}{\sigma})^2\right)^3\right) & \text{if } |\eta| < \sigma \\ \sigma & \text{otherwise} \end{cases}$ | $\Gamma_\sigma(\eta) = \begin{cases} \left(1 - (\frac{\eta}{\sigma})^2\right)^3 & \text{if } |\eta| < \sigma \\ 0 & \text{otherwise} \end{cases}$ |
| Li | $\rho_\sigma(\eta) = \sigma\left(1 - \exp\left(-\frac{\eta^2}{\sigma}\right)\right)$ | $\Gamma_\sigma(\eta) = \exp\left(-\frac{\eta^2}{\sigma}\right)$ |
| Huber | $\rho_\sigma(\eta) = \begin{cases} \eta^2 & \text{if } |\eta| < \sigma \\ 2\sigma|\eta| - \sigma^2 & \text{otherwise} \end{cases}$ | $\Gamma_\sigma(x) = \begin{cases} 1 & \text{if } |\eta| < \sigma \\ \frac{\sigma}{|\eta|} & \text{otherwise} \end{cases}$ |

Fig. 4

Table 2

| No. patches | Visible spectrum | | | Near-infrared spectrum | | |
|---|---|---|---|---|---|---|
| | Our method | F & S | Sunshine | Our method | F & S | Sunshine |
| 1 | 17.25 ± 6.07 | 20.55 ± 10.53 | 9.52 ± 1.40 | 7.41 ± 5.37 | 25.50 ± 8.88 | 19.9 ± 2.24 |
| 5 | 5.62 ± 5.54 | 7.52 ± 4.90 | - | 6.44 ± 5.09 | 7.00 ± 4.56 | - |
| 10 | 5.81 ± 5.63 | 7.42 ± 4.19 | - | 6.65 ± 5.05 | 6.98 ± 4.04 | - |
| 20 | 6.21 ± 5.22 | 7.37 ± 3.88 | - | 6.87 ± 4.95 | 7.03 ± 3.58 | - |
| 30 | 6.49 ± 5.53 | 7.32 ± 3.65 | - | 7.56 ± 5.18 | 7.06 ± 3.46 | - |
| 40 | 6.66 ± 5.86 | 7.29 ± 3.54 | - | 7.85 ± 5.07 | 7.06 ± 3.39 | - |
| 50 | 6.82 ± 5.84 | 7.26 ± 3.50 | - | 7.90 ± 5.25 | 7.09 ± 3.33 | - |

(a) Visible spectrum    (b) Near-infrared spectrum

Table 2

| No. patches | Visible spectrum | | | Near-infrared spectrum | | |
|---|---|---|---|---|---|---|
| | Our method | F & S | Sunshine | Our method | F & S | Sunshine |
| 1 | 13.93 ± 2.83 | 22.17 ± 5.84 | 17.91 ± 5.43 | 9.35 ± 4.63 | 29.46 ± 8.18 | 17.13 ± 2.18 |
| 5 | 13.89 ± 1.25 | 14.06 ± 1.47 | - | 8.08 ± 3.38 | 6.97 ± 2.59 | - |
| 10 | 13.80 ± 1.17 | 14.09 ± 1.35 | - | 8.47 ± 2.58 | 7.31 ± 1.80 | - |
| 20 | 14.00 ± 1.43 | 14.03 ± 1.33 | - | 7.07 ± 2.51 | 7.20 ± 1.38 | - |
| 30 | 13.69 ± 1.53 | 14.00 ± 1.23 | - | 6.98 ± 2.41 | 7.48 ± 1.50 | - |
| 40 | 13.44 ± 2.09 | 13.99 ± 1.22 | - | 7.22 ± 2.48 | 7.69 ± 1.59 | - |
| 50 | 13.85 ± 1.48 | 13.97 ± 1.24 | - | 7.33 ± 2.48 | 7.74 ± 1.45 | - |

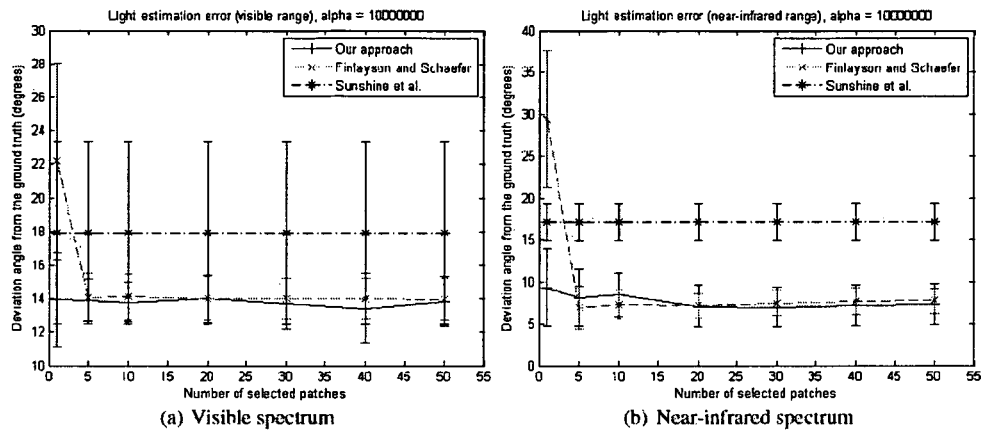
(a) Visible spectrum      (b) Near-infrared spectrum
Fig. 8
Table 4
| Number of patches | | 1 | 5 | 10 | 20 | 30 | 40 | 50 |
|---|---|---|---|---|---|---|---|---|
| CMF | Our method | 3.84 ± 2.86 | 4.18 ± 2.89 | 4.16 ± 2.79 | 3.99 ± 2.61 | 3.94 ± 2.58 | 3.84 ± 2.54 | 3.83 ± 2.55 |
| | F & S | 24.97 ± 10.29 | 5.58 ± 4.68 | 4.50 ± 3.72 | 3.88 ± 3.15 | 3.70 ± 3.04 | 3.66 ± 3.02 | 3.59 ± 2.99 |
| | Sunshine | 6.09 ± 2.60 | 6.09 ± 2.60 | 6.09 ± 2.60 | 6.09 ± 2.60 | 6.09 ± 2.60 | 6.09 ± 2.60 | 6.09 ± 2.60 |
| Canon 10D | Our method | 3.91 ± 2.87 | 4.34 ± 3.01 | 4.15 ± 2.72 | 4.09 ± 2.52 | 3.98 ± 2.45 | 3.90 ± 2.36 | 3.86 ± 2.34 |
| | F & S | 25.37 ± 10.81 | 3.72 ± 3.00 | 3.22 ± 2.17 | 2.82 ± 1.70 | 2.62 ± 1.46 | 2.54 ± 1.40 | 2.46 ± 1.35 |
| | Sunshine | 5.84 ± 2.06 | 5.84 ± 2.06 | 5.84 ± 2.06 | 5.84 ± 2.06 | 5.84 ± 2.06 | 5.84 ± 2.06 | 5.84 ± 2.06 |
| Nikon D70 | Our method | 3.88 ± 2.82 | 4.26 ± 2.88 | 4.17 ± 2.88 | 3.91 ± 2.49 | 3.93 ± 2.46 | 3.85 ± 2.41 | 3.86 ± 2.40 |
| | F & S | 25.67 ± 10.83 | 4.26 ± 3.94 | 3.22 ± 2.30 | 2.74 ± 1.67 | 2.59 ± 1.50 | 2.48 ± 1.37 | 2.43 ± 1.31 |
| | Sunshine | 5.84 ± 2.06 | 5.84 ± 2.06 | 5.84 ± 2.06 | 5.84 ± 2.06 | 5.84 ± 2.06 | 5.84 ± 2.06 | 5.84 ± 2.06 |
Fig. 9
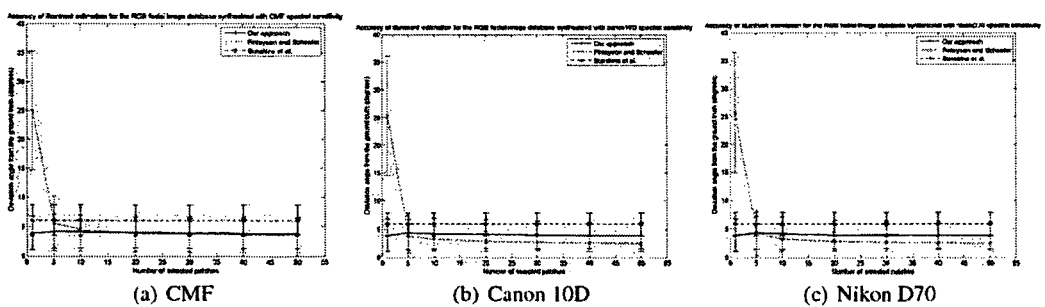
(a) CMF      (b) Canon 10D      (c) Nikon D70
Fig. 10

Table 5

| Number of patches | | 1 | 5 | 10 | 20 | 30 | 40 | 50 |
|---|---|---|---|---|---|---|---|---|
| CMF | Our method | 0.46 ± 0.36 | 0.50 ± 0.36 | 0.97 ± 1.60 | 1.32 ± 2.02 | 1.40 ± 1.72 | 2.18 ± 2.23 | 2.34 ± 2.27 |
| | F & S | 23.93 ± 6.66 | 10.74 ± 2.27 | 11.23 ± 2.03 | 11.23 ± 0.98 | 11.04 ± 0.91 | 10.95 ± 1.00 | 10.99 ± 0.89 |
| | Sunshine | 11.35 ± 1.46 | 11.35 ± 1.46 | 11.35 ± 1.46 | 11.35 ± 1.46 | 11.35 ± 1.46 | 11.35 ± 1.46 | 11.35 ± 1.46 |
| Canon 10D | Our method | 0.94 ± 1.32 | 0.82 ± 1.22 | 1.08 ± 1.56 | 1.08 ± 1.63 | 1.67 ± 2.06 | 1.76 ± 2.08 | 2.22 ± 2.37 |
| | F & S | 22.41 ± 9.68 | 9.33 ± 2.22 | 9.42 ± 2.06 | 9.68 ± 1.45 | 9.66 ± 1.14 | 9.73 ± 1.03 | 9.63 ± 0.99 |
| | Sunshine | 10.33 ± 1.40 | 10.33 ± 1.40 | 10.33 ± 1.40 | 10.33 ± 1.40 | 10.33 ± 1.40 | 10.33 ± 1.40 | 10.33 ± 1.40 |
| Nikon D70 | Our method | 0.78 ± 1.42 | 0.66 ± 0.66 | 0.90 ± 1.02 | 1.60 ± 2.17 | 1.99 ± 2.63 | 2.24 ± 2.57 | 2.70 ± 2.82 |
| | F & S | 24.98 ± 8.74 | 9.98 ± 1.59 | 10.13 ± 2.98 | 9.88 ± 1.22 | 9.88 ± 1.14 | 9.65 ± 1.20 | 9.55 ± 1.00 |
| | Sunshine | 10.33 ± 1.40 | 10.33 ± 1.40 | 10.33 ± 1.40 | 10.33 ± 1.40 | 10.33 ± 1.40 | 10.33 ± 1.40 | 10.33 ± 1.40 |

Fig. 11

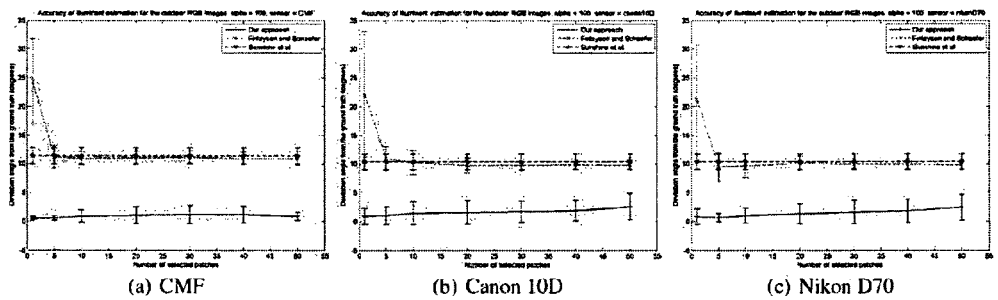

(a) CMF  (b) Canon 10D  (c) Nikon D70

Fig. 12

Table 6

| No. patches | Standard dynamic range (8 bits) | | | Extended dynamic range (16 bits) | | |
|---|---|---|---|---|---|---|
| | Our method | F & S | Sunshine | Our method | F & S | Sunshine |
| 1 | 8.45 ± 6.97 | 25.58 ± 13.72 | 12.92 ± 9.23 | 8.78 ± 7.86 | 24.70 ± 13.61 | 12.45 ± 8.67 |
| 5 | 7.78 ± 6.23 | 9.88 ± 10.71 | - | 8.63 ± 7.75 | 12.85 ± 11.90 | - |
| 10 | 7.78 ± 6.46 | 10.06 ± 10.89 | - | 8.18 ± 7.18 | 11.73 ± 11.00 | - |
| 20 | 7.77 ± 6.69 | 9.41 ± 9.70 | - | 7.88 ± 7.04 | 10.58 ± 9.81 | - |
| 30 | 7.75 ± 6.90 | 9.29 ± 9.76 | - | 7.92 ± 7.03 | 10.30 ± 9.57 | - |
| 40 | 7.82 ± 6.81 | 9.12 ± 9.41 | - | 7.81 ± 7.03 | 10.18 ± 9.54 | - |
| 50 | 7.88 ± 6.77 | 9.25 ± 9.54 | - | 7.75 ± 6.84 | 10.16 ± 9.46 | - |

Fig. 13

(a) Visible spectrum

Table 7

| Feature for classification | CDR(%) | FDR(%) | CR(%) |
|---|---|---|---|
| Estimated reflectance & ground-truth light | 85.12 ± 13.36 | 5.10 ± 6.30 | 90.94 ± 6.12 |
| Estimated reflectance & estimated light | 79.79 ± 22.58 | 8.32 ± 15.78 | 87.00 ± 13.63 |
| Reflectance by illuminant normalisation | 70.63 ± 16.95 | 5.50 ± 5.69 | 84.75 ± 8.04 |
| Raw radiance | 47.27 ± 20.58 | 12.48 ± 11.64 | 71.23 ± 9.17 |
| Top 20 LDA components of raw radiance | 44.83 ± 31.47 | 7.14 ± 11.42 | 73.62 ± 11.54 |

ILLUMINATION SPECTRUM RECOVERY

CROSS REFERENCE TO RELATED APPLICATIONS

The present application claims priority from Australian provisional patent application No. 2009904230 filed 3 Sep. 2009 the content of which is incorporated herein by reference.

The present application claims priority from Australian provisional patent application No. 2010900383 filed 1 Feb. 2010 the content of which is incorporated herein by reference.

The present application is related to International (PCT) application PCT/AU2009/000793 filed 19 Jun. 2009 and published as WO 2009/152583 the content of which is incorporated herein by reference.

The present application is related to International (PCT) application co-filed with the present application and claiming priority from Australian provisional patent application No. 2009904219 filed 3 Sep. 2009 and from Australian provisional patent application No. 2010901785 filed 22 Apr. 2010 the content of which is incorporated herein by reference.

The present application is related to International (PCT) application co-filed with the present application and claiming priority from Australian provisional patent application No. 2009904218 filed 3 Sep. 2009 the content of which is incorporated herein by reference.

TECHNICAL FIELD

The disclosure concerns processing of electronic images, such as hyperspectral or multispectral images. Processing of the images includes object recognition and image enhancement. In particular, but is not limited to, a method, software and computer for determining the illumination spectrum of an image, estimating photometric parameters and selecting sub-images of an image for image processing is also disclosed.

BACKGROUND ART

In multispectral imaging, photometric invariants pose great opportunities and challenges in the areas of material identification [14] and shape analysis. This is due to the information-rich representation of the surface radiance acquired by multispectral and hyperspectral sensing devices, which deliver wavelength-indexed spectral data, i.e. reflectance or radiance data, in thousands of bands across a broad spectrum. As in trichromatic imaging, multispectral reflectance distribution is determined not only by the light source and viewer directions, but also by the material properties of the surface under study.

In computer vision, the modeling of surface reflectance is a topic of pivotal importance for purposes of surface analysis and image understanding. For instance, Nayar and Bolle [42] have used photometric invariants to recognise objects with different reflectance properties.

Since the recovery of illumination spectrum and material reflectance are mutually interdependent, colour constancy is also an issue. Colour constancy is the ability to resolve the intrinsic material reflectance from their trichromatic colour images captured under varying illumination conditions. The research on colour constancy branches in two main trends, one of them relies on the statistics of illuminant and material reflectance, the other is drawn upon the physics-based analysis of local shading and specularity of the surface material.

This disclosure concerns physics-based colour constancy that analyses the physical processes by which light interacts with material for the purpose of illuminant and surface reflectance estimation. The two methods of physics-based colour constancy are Land's retinex theory [35, 36] and the dichromatic reflection model [48]. Land's retinex theory has inspired several computational models of human colour constancy [7]. On the other hand, the dichromatic model describes reflected light as a combination of the body reflection and surface reflection (highlight), which treat the illumination estimation problem as an analysis of highlights from shiny surfaces [32, 33, 39, 53].

U.S. Pat. No. 7,443,539 (Olympus) determines spectral data characteristics of an image and requires a spectrometer (42) and reference plate (51) to compensate for the illuminant.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

SUMMARY

In a first aspect, a computer implemented method is provided for estimating an illumination spectrum of an image comprised of points of wavelength indexed spectral data, the method comprising:

optimising a cost function based on:

(i) differences between the wavelength indexed spectral data and estimates based on a dichromatic reflection model for different dichromatic reflection model parameter values, wherein the dichromatic reflection model includes at least an illumination spectrum parameter, and (ii) a term to constrain model parameter values based on a robust kernel or curvature consistency.

Due to the term, the optimisation of the cost function may be solved in a closed form. In that way, the method is able to achieve an efficient solution to the optimisation problem and with greater accuracy.

The term may be based on minimising the variation of the gradient magnitude of shading or the curvature magnitude variation. That is, the term may be based on the gradient magnitude of the shading or the curvature variation as a measure of smoothness error.

Due to the term, the optimisation of the cost function may be robust against outliers by providing a reduced bias to noise corruption and image acquisition errors as compared to a cost function based on only squares of the differences.

Due to the term, errors in the wavelength indexed spectral data due to noise may have reduced difference to the estimates based on the dichromatic model.

The bias of the kernel is based on the difference between a determined gradient magnitude of the shading of a point in the image and a determined gradient magnitude of shading of a local neighbourhood of that point in the image. This may be determined for each point.

The kernel function may render the cost function robust against outliers on estimated surface normals on the image. The kernel function may be based on a Huber estimator, Tukey bi-weight function or Lee adaptive potential functions.

The term may constrain curvature of a point in the image to be similar to curvature of a local neighbourhood of that point in the image. This may be determined for each point.

The term may favour, that is assigns a larger weight to, points that belong to the same or similar shape or radiance in the image.

The term may based on curvature induced by the shading or radiance in the image, for example it may use principal curvatures.

The term may be based on limiting differences between one or more model parameters values between neighbouring spectral wavelengths.

In a second aspect, a computer implemented method is provided for estimating an illumination spectrum of an image comprised of points of wavelength indexed spectral data, the method comprising:

optimising a cost function based on:

(i) differences between the wavelength indexed spectral data and estimates based on a dichromatic reflection model for dichromatic reflection model parameter values, wherein the dichromatic reflection model includes at least an illumination spectrum parameter and the differences are determined by fitting the wavelength indexed spectral data to a hyperplane of the dichromatic reflection model spanned by a combination of linearly independent vectors and where the hyperplane constrains illumination spectrum parameter values, and (ii) a term to constrain model parameter values.

Basis vectors may span the hyperplane to constrain illumination spectrum parameter values and reflectance parameter values.

The cost function may be in closed form due to the use of intermediate variables which represent the illumination spectrum parameter in terms of elementary functions, such as constants, algebraic operations, nth roots, exponents, logarithms, trigonometric functions and their inverses.

In a third aspect, a computer implemented method is provided for estimating an illumination spectrum of an image comprised of points of wavelength indexed spectral data, the method comprising:

optimising a cost function based on:

(i) differences between the wavelength indexed spectral data and estimates based on a dichromatic reflection model for different dichromatic reflection model parameter values, wherein the dichromatic reflection model includes at least an illumination spectrum parameter, and (ii) a term to constrain model parameter, wherein the cost function is iteratively optimised and the illumination spectrum parameter value is initialised with a uniform illumination spectrum or based on a solution of a further cost function based on only the differences.

It is an advantage of this initialisation that it reduces the bias of the estimated illumination spectrum toward an undesired trivial solution.

The further cost function may be according to the method proposed by Finlayson & Schaefer [21].

In relation to the first, second and third method the following optional features are provided.

The image may be a hyperspectral or multispectral image that represents a captured scene. Alternatively, the image may be a trichomatic image derived from hyperspectral or multispectral data. Alternatively, the image may be a trichomatic image where the wavelength indexes are based on colour channels.

Estimates based on the dichromatic reflection model may be determined by fitting the wavelength indexed spectral data to a hyperplane representing the dichromatic reflection model, the hyperplane having at least illumination spectrum as a basis. The hyperplane may also have diffuse radiance spectrum as a basis.

The dichromatic reflection model may further include one or more of:
a surface shading parameter,
a surface reflectance parameter, and
a specularity parameter.

Optimising the cost function may further comprise iteratively optimising the cost function for a first subset of parameters and then a second subset of parameters, wherein the first subset of parameters includes the illumination spectrum parameter, and the second subset of parameters includes one or more of surface shading parameter, surface reflectance parameter and specularity parameter.

Optimizing the cost function with respect to the first subset of parameters may be independent of the constraint term, since the constraint (i.e. regularization) term does not have an illumination spectrum component.

Optimizing the difference with respect to the second subset of parameters may be dependent upon the constraint term.

Where the image is a set of sub-images, the values for the second subset of parameters of a sub-image are optimised independently of the values of the second subset of parameters for the other sub-images. The sub-images may be identified according to the fifth aspect described below. Therefore the sub-images may have smooth shading and uniform surface reflectance (i.e. homogenous).

The cost function may assess each point (e.g. location or pixel) of the image. The cost function may be a linear combination and the constraint term is a geometric term. The cost function may include a balancing factor to balance the differences and constraint term.

The method may further comprise identifying the illumination spectrum parameter value that optimised the cost function as the estimate of the illumination spectrum of the image, such as providing the estimate as output or storing the estimate. The method may comprise completing optimising when the illumination spectrum parameter value does not change by more than a predetermined amount between one or more iterations.

The method may further comprise using the estimated illumination spectrum of the image in further processing associated with the image, being one or more of:
image editing;
shape estimation;
material recognition or classification; and
hardware calibration.

In a fourth aspect, a computer implemented method is provided for estimating surface reflectance, surface shading and specularity components of an image comprised of points of wavelength indexed spectral data, wherein the illumination spectrum of the image is known, the method comprising:

(a) for each point in the image, estimating surface reflectance of that point based on a dichromatic reflection model, the illumination spectrum and the wavelength indexed spectral data; and (b) for each point in the image, estimating the surface shading and specularity based on the wavelength indexed spectral data, the dichromatic reflection model, the illumination spectrum and estimated surface reflectance.

It is an advantage of the fourth aspect that photometric parameters can be estimated in a way that the estimated spectral reflectance is used to estimate or re-estimate the surface shading and specularity. This exploits that the surface reflectance is often more stable than surface shading and specularity.

The method may be performed for a subset of points of the image.

Step (b) directly above may comprise:

for each point in the image, estimating the reflectance spectrum of that point based on the wavelength indexed spectral data of a local neighbourhood of that point in the image; and fitting the wavelength indexed spectral data of each point of the image onto a subspace spanned by the illumination spectrum and the reflectance spectrum.

Step (b) may further comprise minimizing the difference between the wavelength indexed spectral data and the subspace spanned by the illumination spectrum and the reflectance spectrum.

Step (a) of estimating surface reflectance of that point may be based on the wavelength indexed spectral data of a local neighbourhood of that point in the image, such that the local neighbourhood exhibits slowly varying surface reflectance.

The method may further comprise the initial step of estimating the illumination spectrum according to the method of one or more the first, second or third aspects.

In a fifth aspect, a computer implemented method is provided for selecting sub-images of an image for use in estimating an illumination spectrum of the image where the image is comprised of points of wavelength indexed spectral data, the method comprising:

(a) identifying multiple candidate sub-images of the image;

(b) for each candidate sub-image, fitting a hyperplane based on a dichromatic reflection model to the wavelength indexed spectral data of the candidate sub-image; and (c) selecting candidate sub-images having wavelength indexed spectral data that does not deviate from fitting the hyperplane by more than a determined amount.

It is an advantage that sub-images of uniform reflectance can be automatically selected in this way on any arbitrary image. The sub-images can then be used by further techniques that analyze the image.

Step (c) may further comprise selecting sub-images also having a high contrast based on a variance of the mean wavelength indexed spectral data over the wavelengths.

The determined amount of step (c) may be candidate sub-images that have a determined percentage of wavelength indexed spectral data that does not deviate from the hyperplane.

Step (b) may comprise fitting a radiance vector representation of the wavelength indexed spectral data.

In a sixth aspect, a computer implemented method is provided for estimating an illumination spectrum of an image, the method comprising:

(a) selecting sub-images of the image according to the method of the fifth aspect; and (b) estimating the illumination spectrum of the image according to the method of the first, second or third aspect, where only the selected sub-images are used in the estimation.

In a seventh aspect, two or more of the methods of the first, second, third, fourth and fifth aspects may be performed in combination. The optional features of the methods of the first, second, third, fourth or fifth aspects are also optional features of the combined method.

In a eight aspect, software is provided, that when installed on a computer causes the computer to perform the method of any one or more first, second, third, fourth or fifth aspects above. The optional features of the methods of the first, second, third, fourth or fifth aspects are also optional features of the software.

In an ninth aspect, a computer is provided comprising a processor to perform the method of one or more of the methods of the first, second, third, fourth or fifth aspects above. The optional features of the methods of the first, second, third, fourth or fifth aspects are also optional features of the computer. Examples of a computer include a standalone personal computer or simply a processor, such as a processor incorporated in a camera.

For all the above aspects, a point may be one or more pixels. A wavelength may be a single wavelength or a wavelength band.

In some embodiments the estimates of the characteristics/components/parameters of the image, such as illumination spectrum or the shading factor, may be sufficiently accurate to be considered a determination.

BRIEF DESCRIPTION OF THE DRAWINGS

A examples will now be described with reference to the accompanying drawings in which:

FIG. 1 shows the notation used in the description below.

FIG. 2 shows the pseudo code of Algorithm 1 to estimate the dichromatic variables from a set of homogenous patches.

FIG. 3 shows the pseudo code of Algorithm 2 to estimate the shading, secularity and reflectance of an image where the illuminant spectrum is known.

FIG. 4 shows Table 1 having a comparison of accuracy versus the number of patches used in the illuminant estimation method on the multi-spectral facial image database captured under both visible and near-infrared spectra, in degrees, compared to Finalyson and Schaefer's method (F & S) and Sunshine et al.'s method;

FIG. 8 graphically shows accuracy versus the number of patches used for our in the illuminant estimation example on the multispectral outdoor image database, in degrees, compared to Finlayson and Schaefer's method (F & S) and Sunshine et al.'s method. The results for both the visible (left) and near-infrared ranges (right) are shown;

FIG. 9 shows Table 4 having a comparison of Accuracy of the illuminant estimation example with $\alpha=10000$ on the synthesized RGB face image database, in degrees, compared to Finlayson and Schaefer's method (F & S) and Sunshine et al.'s approach. We show the results on RGB face images synthesized from the ultispectral face imagery for the Stiles and Burch's colour matching functions (rows 2-4), the spectral sensitivity response functions of a Canon 10D (rows 5-7) and a Nikon D70 camera (rows 8-10);

FIG. 10 shows graphically the accuracy versus number of image patches for our illuminant estimation method with $\alpha=10000$ on the RGB face images synthesize from the multispectral face imagery, in degrees, compared to Finlayson and Schaefer's method (F & S) and Sunshine et al.'s approach. From left to right: Results for simulated RGB images as captured with (a) Stiles and Burch's colour matching functions (b) a Canon 10D camera sensor (c) a Nikon D70 camera sensor;

FIG. 11 shows Table 5 having a comparison of Accuracy of our illuminant estimation method with 0:=100 on the synthesized RGB outdoor image database, in degrees, compared to Finlayson & Schaefer's method (F & S) and Sunshine et al.'s approach. We show the results on RGB outdoor images synthesized from the multispectral outdoor imagery for the Stiles and Burch's colour matching functions (rows 2-4), the spectral sensitivity responses functions of a Canon 100 (rows 5-7) and a Nikon 070 camera (rows 8-10);

FIG. 12 graphically shows the accuracy of our illumant estimation example with $\alpha$=100 on the RGB outdoor images synthesized from the multi-spectral image database, in degrees, compared to Finlayson & Schaefer's method (F & S) and Sunshine et al.'s method, versus the number of patches used. From left to right are the results for simulated RGB images as captured with (a) Stiles and Burch's colour matching functions [15] (b) a Canon 10D camera sensor and (c) a Nikon D70 camera sensor;

FIG. 13 shows Table 6 having a comparison of accuracy of our illuminant estimation example with $\alpha$=1000 on the Mondrian and specular datasets reported in [4], in degrees, compared to Finlayson and Schaefer's method (F & S) and Sunshine et al.'s approach. The accuracy is measured in degrees;

BEST MODES

Introduction

Figures 5, 6, 7:
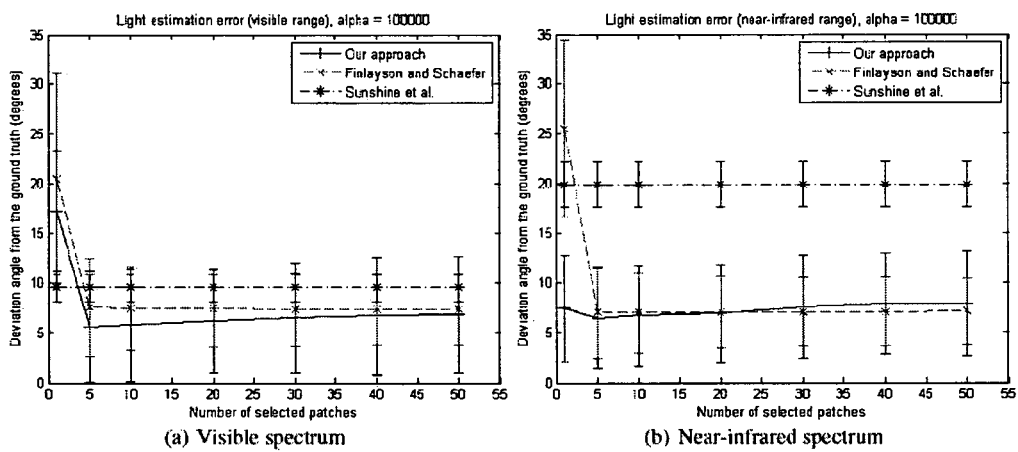
FIG. 5 shows Table 2 having a comparison of accuracy versus number of patches used in the illumination estimation example on multispectral facial image database, in degrees, compared to Finlayson and Schaefer's method (F & S) and Sunshine et al.'s method. The results are for both the visible (left) and near-infrared ranges (right) are shown.
FIG. 6 shows graphically the accuracy versus the number of patches used by the example on the multispectral facial image database compared to two other known methods.
FIG. 7 shows Table 3 having a comparison of accuracy, in degrees, versus the number of patches used for our illuminant estimation method on multispectral outdoor image database captured under both the visible and near-infrared spectra compared to Finlayson and Schaefer's methods (F & S) and Sunshine et al.'s approach.

In this example we determine photometric invariance in multispectral imaging making use of an optimization approach based upon the dichromatic model. We cast the problem of recovering the spectra of the illuminant L, the surface reflectance s and the shading g and specular k factors in a structural optimisation setting. Making use of the additional information provided by multispectral imaging and the structure of image patches, we recover the dichromatic parameters L, g, S and k of the scene. To do this, we formulate a target cost function combining the dichromatic error and the smoothness priors for the surfaces under study. The dichromatic parameters L, g, S and k are recovered through minimising this cost function in a coordinate descent manner. The method used has the advantage of being general in nature, admitting the enforcement of smoothness constraints and extending in a straightforward manner to trichromatic settings. Moreover, the objective function is convex with respect to the subset of variables to be optimised in each alternating step of the minimisation strategy. This gives rise to an optimal closed-form solution for each of the iterations in our method. We illustrate the effectiveness of our method for purposes of illuminant spectrum L recovery, highlight removal and skin recognition. We also compare our results to a number of alternatives.

1. Example 1

This example will be described with reference to the flow charts of FIGS. 21 to 24. This example integrates the recovery of the illuminant L, photometric invariants, i.e. the material reflectance k, the shading g and specularity k factors from a single multispectral image in a unified optimisation framework. This example extends the colour constancy problem from trichromatic to multispectral and hyperspectral imagery, and also confers several advantages.

(i) By optimising the data closeness to the dichromatic model, the method is generally applicable to surfaces exhibiting both diffuse and specular reflection.

(ii) No assumption is made on the parametric form or prior knowledge of the illuminant and surface reflectance spectra. This is in contrast to other approaches where assumptions are made on the chromaticities of common light sources or the finite linear model of illuminants and surface reflectance.

(iii) Compared to other methods which make use of the dichromatic model, this example performs well even on a small number of different material reflectance spectra.

(iv) Unlike the dichromatic plane-based methods for trichromatic imagery, this example does not require pre-segmented images as input. Instead, an automatic dichromatic patch selection process determines the uniform-albedo patches to be used for illuminant estimation.

(v) The noise perturbation analysis shows that our illumination estimation method is more accurate than the alternatives and stable with respect to the number of surface patches used.

(vi) The optimisation framework presented here is flexible and general in the sense that any regulariser on the surface geometry can be incorporated into the method. This example includes two instances of robust regularisers for the smoothness of the shading field.

(vii) Compared to U.S. Pat. No. 7,443,539, this example does not require a second sensor, do not require a reference plate, auto white balancing can be done using only software so overall the solution can be provided as a lower cost.

Here we address the problem of recovering photometric invariants, namely material/surface reflectance S, through an estimation of the illumination power spectrum L, the shading g and specularity k from a single multispectral image. Our proposed method assumes that the scene is uniformly illuminated. This assumption is common and valid for a wide range of situations, e.g. where the scene is illuminated by natural sun light or a distant light source. Based upon the dichromatic reflection model [48], we cast the recovery problem as an optimisation one in a structural optimisation setting. Making use of the additional information provided by multispectral imaging and the structure of automatically selected image patches, we recover the dichromatic parameters L, g, s and k of the scene. Since the objective function is convex with respect to each variable subset to be optimised upon, we can recover a closed-form solution which is iteration-wise optimal. We employ a quadratic surface smoothness error as a regulariser and show how a closed-form solution can be obtained when alternative regularisers are used.

2. Recovery of the Reflection Model Parameters

We present here the target function employed in this example. We elaborate further on the optimisation approach adopted here for the recovery of the surface geometry g and diffuse reflectance S according to the dichromatic reflection model.

This example uses structural approach based upon the processing of smooth surface-patches whose reflectance S is uniform over all those pixels they comprise. As mentioned earlier, the process of recovering the photometric parameters for the image is based on an optimisation method which aims at reducing the difference between the estimate yielded by the dichromatic model and the wavelength-indexed spectral data I. We commence by providing an overview of the dichromatic model as presented by Shafer [48]. Subsequently, we formulate a target minimisation function with respect to the model in [48] and formulate an optimisation strategy based upon the radiance structure drawn from smooth image patches with uniform reflectance. We also present our strategy for selecting patches used by the algorithm and describe in detail the coordinate descent optimisation procedure. This optimisation strategy is based upon interleaved steps aimed at recovering the light spectrum L, the surface shading g and surface reflectance s properties so as to recover the optima of the dichromatic reflection parameters (dichromatic parameters) L, S, g and k.

2.1 the Dichromatic Reflection Model

We employ the dichromatic model introduced by Shafer [48] so as to relate light spectral power, surface reflectance and surface radiance. This model assumes uniform illumination across the spatial domain of the observed scene. Following this model, surface radiance is decomposed into a diffuse and a specular component. Let an object represented in an image having spectral data (e.g. spectral radiance or spectral reflectance) $I(\lambda,u)$ at pixel-location u and wavelength $\lambda$ be illuminated by an illuminant whose spectrum is $L(\lambda)$. With this ingredients, the dichromatic model then becomes $$I(\lambda,u)=g(u)L(\lambda)S(\lambda,u)+k(u)L(\lambda) \quad (1)$$

In Equation 1, the shading factor g(u) governs the proportion of diffuse light reflected from the object and depends solely on the surface geometry. Note that, for a purely Lambertian surface, we have $g(u)=\overrightarrow{\cos(n(u))}, \vec{L}$ i.e. the cosine of the angle between the surface normal $\overrightarrow{n(u)}$ and the light direction $\vec{L}$. On the other hand, the factor k(u) models surface irregularities that cause specularities in the scene. Using this model, we aim to recover the shading factor g(u), the specular coefficient k(u), the light spectrum $L(\lambda)$ and the spectral reflectance $S(\lambda,u)$ at location u and wavelength $\lambda$ from the spectral radiance $I(\lambda,u)$ of the image.

2.2 Target Function

With the dichromatic model above, we proceed to define our target function for purposes of optimisation. This example takes as input a multispectral image whose pixel values correspond to the measurements of the spectral radiance $I(\lambda,u)$ indexed to the wavelengths $\lambda \in \{\lambda_1, \ldots \lambda_n\}$. As mentioned previously, our goal is fitting the observed data $I(\lambda,u)$ to the dichromatic model to recover the parameters g(u), k(u) and $S(\lambda,u)$. In general, here we view the dichromatic cost function of a multispectral image I as the weighted sum of its dichromatic error and a constraint term referred to here as a geometric regularisation term R(u) for each image location. This is $$F(I) \stackrel{\Delta}{=} \sum_{u \in I} \left[ \sum_{i=1}^{n} [I(\lambda_i, u) - L(\lambda_i)(g(u)S(\lambda_i, u) + k(u))]^2 + \alpha R(u) \right] \quad (2)$$

In equation 2, $\alpha$ is a constant that acts as a balancing factor between the dichromatic error and the regularisation term R(u) on the right-hand side. The wavelength-independent regularisation term R(u) is related to the scene geometry and will be elaborated upon later.

For now, we focus our attention on the solution space of Equation 2. Note that minimising the cost F(I) without further constraints is an underdetermined problem. This is due to the fact that, for an image with n spectral bands containing m pixels, we would have to minimize over 2m+n+m×n variables while having only m×n terms in the summation of Equation 2. However, we notice that this problem can be further constrained if the model is applied to smooth surfaces made of the same material, i.e. the albedo is regular across the patch or image region under consideration. This imposes two constraints. Firstly, all locations on the surface share a common diffuse reflectance. Therefore, a uniform albedo surface P is assumed to have the same reflectance for each pixel u∈P, $S(\lambda_i,u)=S_P(\lambda_i)$. Note that this constraint significantly reduces the number of unknowns $S(\lambda_i,u)$ from m×n to N×n, where N is the number of surface albedos in the scene. In addition, the smooth variation of the patch geometry allows us to formulate the regularisation term R(u) in equation 2 as a function of the shading factor g(u). In brief, smooth, uniform albedo surface patches naturally provide constraints so as to reduce the number of unknowns significantly while providing a plausible formulation of the geometric regularisation term R(u).

Following the rationale above, we proceed to impose constraints on the minimisation problem at hand. For smooth, regular surface patches, we consider the cost function for a surface patch P∏ and write $$F(P) \triangleq \sum_{u \in P} \left[ \sum_{i=1}^{n} [I(\lambda_i, u) - L(\lambda_i)(g(u)S_P(\lambda_i) + k(u))]^2 + \alpha R(u) \right]$$

As before, we have $S(\lambda_i,u)=S_P(\lambda_i)$, for all u∈P. Furthermore, the smoothness constraint on the patch implies that the shading factor g(u) should vary smoothly across the pixels in P. This constraint can be effectively formulated by minimising the variation of gradient magnitude of the shading map. This, effectively, precludes discontinuities in the shading map of P via the regularisation term $$R(u) \triangleq \left[\frac{\partial g(u)}{\partial x(u)}\right]^2 + \left[\frac{\partial g(u)}{\partial y(u)}\right]^2 \quad (3)$$

where the variables x(u) and y(u) are the column and row coordinates, respectively, for pixel location u.

Thus, by making use of the set P of regular patches in the image I, we can recover the dichromatic model parameters by minimising the target function as an alternative to $$F^*(I) \triangleq \sum_{P \in \mathcal{P}} F(P) \quad (4)$$
$$= \sum_{P \in \mathcal{P}} \sum_{u \in P}$$
$$\left[ \sum_{i=1}^{n} [I(\lambda_i, u) - L(\lambda_i)(g(u)S_P(\lambda_i) + k(u))]^2 + \alpha R(u) \right]$$

as an alternative to F(I).

2.3 Light Spectrum Recovery
2.3.1 Homogeneous Patch Selection 120

Above we formulated the recovery of the dichromatic model parameters as an optimisation procedure over the surface patch-set P. Here we describe our method for automatically selecting regular surface patches for the minimisation of the cost function in Equation 4. The automatic patch selection method presented here allows the application of our method to arbitrary images. This contrasts with other methods elsewhere in the literature [21, 22, 54, 55], which are only applicable to pre-segmented images.

Our patch selection strategy is performed as follows. We first subdivide 112 the image into patches of equal size in a lattice-like fashion. For each patch, we fit 114 a two-dimensional hyperplane to the spectral data of radiance or reflectance vectors of the pixels in the patch. Next, we note that, in perfectly dichromatic patches, the wavelength-indexed radiance vector of each pixel lies perfectly in this hyperplane, i.e. the dichromatic plane. To allow for noise effect, we regard dichromatic patches as those containing a percentage of at least $t_p$ pixels whose radiance vectors deviate from their projection given by the Singular Value Decomposition (SVD) in [54]. We do this by setting an upperbound $t_a$ on the angular deviation from the dichromatic plane, where $t_p$ and $t_a$ are global parameters.

However, not all these patches may be useful for purposes of illumination spectrum recovery. This is due to the fact that perfectly diffuse surfaces do not provide any information regarding the illuminant spectrum. The reason being that, a spectral radiance vector space for this kind of surface is one-dimensional, spanned only by the wavelength-indexed diffuse radiance vector. On the other hand, the dichromatic model implies that the specularities have the same spectrum as the illuminant, where the specular coefficient can be viewed as a scaling factor solely dependent on the surface geometry.

Thus, for the recovery of the dichromatic model parameters, we only use highly specular patches by selecting 116 regions with the highest contrast amongst those deemed to have a uniform albedo. We recover the contrast of each patch by computing the variance of the mean radiance over the spectral domain. These highly specular patches provide a means to the recovery of the light spectrum L. This is due to the fact that, for highly specular surface patches with uniform albedo, the surface diffuse radiance vector and the illuminant vector span a hyperplane in the radiance space. This is a property in colour constancy, where approaches [24, 33, 37] have employed subspace projection for purposes of light power spectrum recovery.

2.3.2 Optimisation Procedure 122

We now present the optimisation procedure employed in our method using the notation presented in FIG. 1. Here, we adopt an iterative approach so as to find the variables L, $S_P$, $g_P$ and $k_P$ which yield the minimum of the cost function in Equation 4 100. At each iteration, we minimise the cost function with respect to L and the triplet $\{g_P, k_P, S_P\}$ in separate steps.

The procedure presented here is, in fact, a coordinate descent approach [6] which aims at minimising the cost function. The step sequence of our minimisation strategy is summarised in the pseudocode of Algorithm 1 shown in FIG. 2. The coordinate descent approach comprises two interleaved minimisation steps. At each iteration, we index the dichromatic variables to iteration number t and optimise the objective function, in interleaved steps, with respect to the two subsets of variables $\{g_P, k_P, S_P\}$, $\{L\}$. Once the former variables are at hand, we can obtain optimal values for the latter ones. We iterate between these two steps until convergence is reached.

Figure 21:
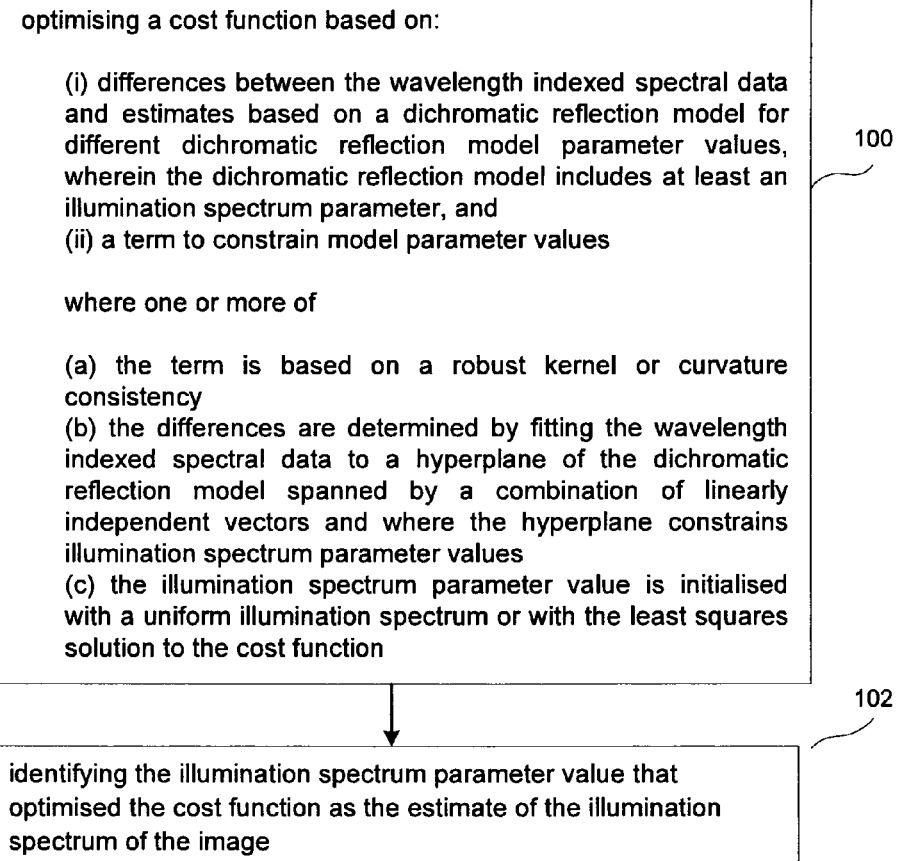
FIG. 21 is a flow chart of the method for estimating the illumination spectrum for an image of Example 1.
Figure 22:
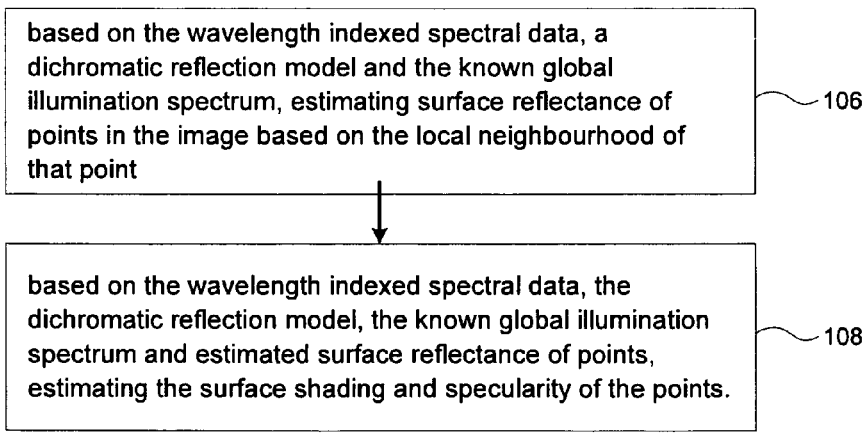
FIG. 22 is a flow chart of the method for estimating the surface reflectance, surface shading and specularity components of an image of Example 1.
Figure 23:
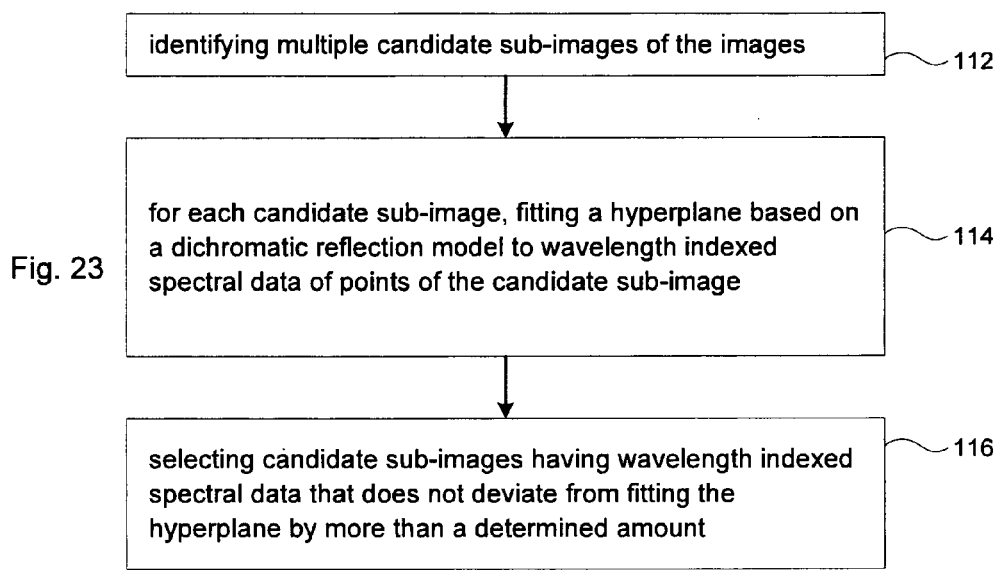
FIG. 23 is a flow chart of the method for selecting sub-images of an image for use in estimating the illumination spectrum for the image of Example 1.
Figure 24:
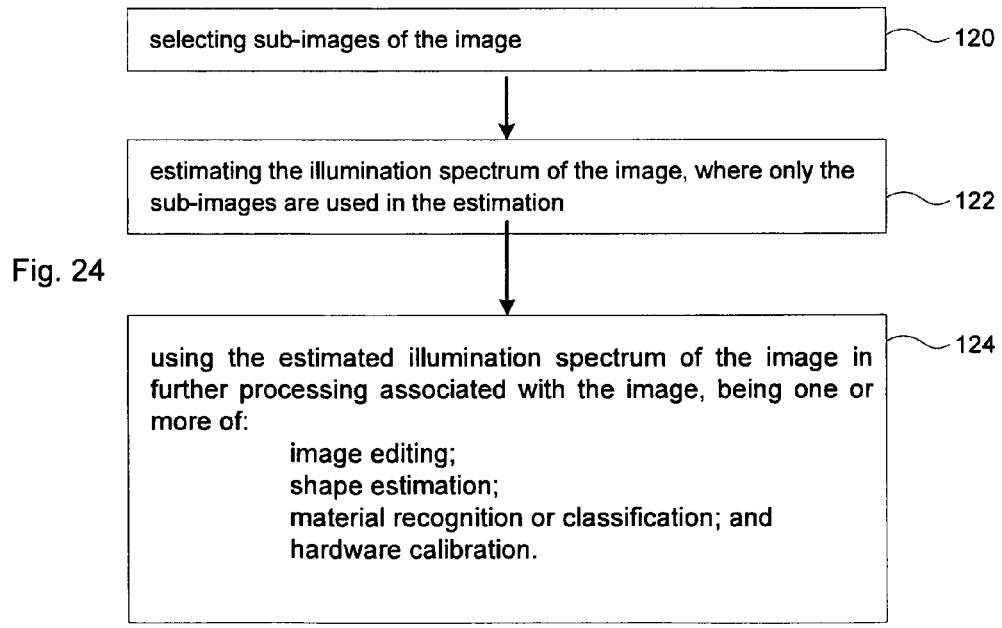
FIG. 24 is a flow chart of the method for estimating the illumination spectrum of an image of Example 1.

The algorithm commences by initialising the unknown light spectrum L(λ) to an unbiased uniform illumination spectrum (See FIG. 21, 100(c)), as indicated in Line 1 of Algorithm 1. It terminates to identify the value of the illumination spectrum parameter L that optimizes this cost function 102 once the illuminant spectrum does not change, in terms of angle, by an amount beyond a preset global threshold $t_L$ between two successive iterations. In the following two subsections we show that the two optimisation steps above can be employed to obtain the optimal values of the dichromatic parameters in closed form.

Recovery of the Patch-Set Surface Geometry

In the first step, we estimate the optimal surface reflectance 106 and geometry given the light spectrum $L^{t-1}$ recovered at iteration t−1. This corresponds to Lines 3-5 in Algorithm 1. Note that, at iteration t, we can solve for the unknowns $g_P^t$, $k_P^t$ and $S_P^t$ separately for each surface patch P. This is because these variables appear in separate terms in Equation 4. This step is, therefore, reduced to minimising $$F(P)|_{L^{t-1}} = \sum_{u \in P} \left[ \|I(u) - g(u)D_P^{t-1} - k(u)L^{t-1}\|^2 + \alpha R(u) \right] \quad (5)$$

where the diffuse radiance vector $D_P^{t-1} \square L^{t-1} \cdot S_P$ is the component-wise multiplication of the illuminant and surface reflectance spectra, and $\|\cdot\|$ denotes the $L_2$-norm of the argument vectors.

Note that the minimisation above involves $2|P|+n$ unknowns, where $|P|$ is the number of pixels in patch P. Hence, it becomes computationally intractable when the surface area is large. In practice, the selected patches need only be large enough so as to gather useful statistics from the spectral data. Moreover, as mentioned earlier, we can further reduce the degrees of freedom of the unknowns by noting that the spectral radiance vectors at all pixels in the same surface lie in a 2-dimensional subspace $Q \subset R^n$, spanned by the diffuse radiance vector $D_P^{t-1}$ and the light vector $L^{t-1}$. This is a characteristic of the dichromatic model that has been utilised by in work on colour constancy [21, 22, 54, 55].

Having all the pixel radiance vectors I(u) at hand, one can obtain the subspace Q via Singular Value Decomposition (SVD). Denote the two basis vectors resulting from this SVD operation $z_1$ and $z_2$ and, accordingly, let the subspace be $Q=\text{span}(z_1,z_2)$. Since $D_P^{t-1} \in Q$, we can parameterise $D_P^{t-1}$ up to scale as $D_P^{t-1} = vz_1+z_2$.

Likewise, the light vector $L^{t-1} \in Q$ can also be decomposed as $L^{t-1}=w_1z_1+w_1z_2$, where the values of $w_1$ and $w_2$ are two known scalars. Furthermore, the dichromatic plane hypothesis also implies that, given the light vector $L^{t-1}$ and the surface diffuse radiance vector $D_P^{t-1}$ one can decompose any pixel radiance I(u) into a linear combination of the former two vectors. In other words, $$I(u) = g(u)D_P^{t-1} + k(u)L^{t-1} \quad (6)$$
$$= (g(u)v + k(u)w_1)z_1 + (g(u) + k(u)w_2)z_2$$

Having obtained the basis vectors $z_1$, $z_2$ we can compute the mapping of the pixel radiance I(u) onto the subspace Q. This is done with respect to this basis by means of projection so as to obtain the scalars $\Sigma_1(u)$, $\tau_2(u)$ (see FIG. 21, 100(b)) such that $$I(u) = \tau_1(u)z_1 + \tau_2(u)z_2 \quad (7)$$

Further, by equating the right hand sides of Equations 6 and 7, we obtain $$g(u) = \frac{w_2\tau_1(u) - w_1\tau_2(u)}{w_2v - w_1} \quad (8)$$

$$k(u) = \frac{\tau_2(u)v - \tau_1(u)}{w_2v - w_1} \quad (9)$$

From Equations 8 and 9, we note that g(u) and k(u) are univariate rational functions of v.

Moreover, $D_P^{t-1}$ is a linear function with respect to v. We also observe that the term R(u) is only dependent on g(u). Therefore, the objective function in Equation 5 can be reduced to a univariate rational function of v. Thus, substituting the Equations 8 and 9 into the first and second term on the right hand side of Equation 5, we have $$F(P)|_{L^{t-1}} = \sum_{u \in P} \left\| I(u) - \frac{w_2\tau_1(u) - w_1\tau_2(u)}{w_2v - w_1}(vz_1+z_2) - \frac{\tau_2(u)v - \tau_1(u)}{w_2v - w_1}L^{t-1} \right\|^2 + \quad (10)$$

$$\sum_{u \in P} \frac{\alpha}{(w_2v - w_1)^2} \left[ \left(\frac{\partial m(u)}{\partial x(u)}\right)^2 + \left(\frac{\partial m(u)}{\partial y(u)}\right)^2 \right]$$

$$= \sum_{u \in P} \frac{1}{(w_2v - w_1)^2}$$

$$\left\| \begin{array}{c} I(u)w_2 - (w_2\tau_1(u) - w_1\tau_2(u))z_1 - \tau_2(u)L^{t-1})v - \\ (I(u)w_1 - (w_2\tau_1(u) - w_1\tau_2(u))z_2 - \tau_1(u)L^{t-1} \end{array} \right\|^2 +$$

$$\frac{\alpha}{(w_2v - w_1)^2} \sum_{u \in P} \left[ \left(\frac{\partial m(u)}{\partial x(u)}\right)^2 + \left(\frac{\partial m(u)}{\partial y(u)}\right)^2 \right]$$

$$= \sum_{u \in P} \left\| \frac{p(u)v - q(u)}{w_2v - w_1} \right\|^2 + \frac{\alpha N}{(w_2v - w_1)^2}$$

$$= \sum_{u \in P} \left\| \frac{p(u)}{w_2} + \frac{\frac{w_1}{w_2}p(u) - q(u)}{w_2v - w_1} \right\|^2 + \frac{\alpha N}{(w_2v - w_1)^2}$$

$$= \sum_{u \in P} \frac{\|p(u)\|^2}{w_2^2} + \left\| \frac{2}{w_2v - w_1} \right\|^2$$

$$\sum_{u \in P} \left\langle \frac{p(u)}{w_2}, \frac{w_1}{w_2}p(u) - q(u) \right\rangle +$$

$$\frac{1}{(w_2v - w_1)^2} \left( \sum_{u \in P} \left\| \frac{w_1}{w_2}p(u) - q(u) \right\|^2 + \alpha N \right)$$

where $\langle \cdot, \cdot \rangle$ denotes the inner-product of two vectors, and $$m(u) = w_2\tau_1(u) - w_1\tau_2(u)$$
$$p(u) = I(u)w_2 - (w_2\tau_1(u) - w_1\tau_2(u))z_1 - \tau_2(u)L^{t-1}$$
$$q(u) = I(u)w_1 - (w_2\tau_1(u) - w_1\tau_2(u))z_2 - \tau_1(u)L^{t-1}$$
$$N = \sum_{u \in P} \left[ \left(\frac{\partial m(u)}{\partial x(u)}\right)^2 + \left(\frac{\partial m(u)}{\partial y(u)}\right)^2 \right]$$

Note that p(u), q(u), $w_1$ and $w_1$ are known given the vector $L^{t-1}$. With the change of variable $$r = \frac{1}{w_2v - w_1}$$

we can write the right hand side of Equation 10 as a quadratic function of r whose minimum is attained at $$r^* = -\frac{\sum_{u \in P} \left\langle \frac{p(u)}{w_2}, \frac{w_1}{w_2} p(u) - q(u) \right\rangle}{\sum_{u \in P} \left\| \frac{w_1}{w_2} p(u) - q(u) \right\|^2 + \alpha N} \quad (11)$$

This gives the corresponding minimiser $$v^* = \frac{1}{w_2}\left(\frac{1}{r^*} + w_1\right).$$

Hence, given the illuminant spectrum $L^{t-1}$, one can recover $g_P$, $k_P$ by substituting the optimal value of $v$ into Equations 8 and 9.

The diffuse radiance component is computed as $D_P^t = v^* z_1 + z_2$, and the spectral reflectance at wavelength $\lambda$ is given by $$S_P^t(\lambda) = \frac{D_P^t(\lambda)}{L^{t-1}(\lambda)}.$$

In this example we use a 2-dimensional hyperplane since the dichromatic model of each material implies that spectral radiance or RGB image colours can be represented as a 2-dimensional hyperplane. Alternatively, more complex models can be used that may include a term for the interreflection or ambient light, which correspond to additional dimensionality.

Recovery of the Illuminant Spectrum L

In the second step of each iteration t, we solve for $L^t$ and $S_{P_1}^t, \ldots, S_{P_r}^t$ given $g_P^t$ and $k_P^t$. Since the second term $R(u)$ in Equation 4 is wavelength-independent, the optimisation problem in line 6 of Algorithm 1 can be reduced to minimising $$F^*(\mathcal{I})|_{g^t,k^t} = \sum_{P \in \mathcal{P}} \sum_{u \in P} \|I(u) - g^t(u) D_P - k^t(u) L\|^2 \quad (12)$$

$$= \sum_{P \in \mathcal{P}} \sum_{u \in P} \sum_{i=1}^{n} (I(\lambda_i, u) - g^t(u) D_P(\lambda_i) - k^t(u) L(\lambda_i))^2$$

where $D_P = L \cdot S_P$.

Since the objective function 12 is quadratic, and, therefore convex with respect to L and $D_P$, the optimal values of these variables can be obtained by equating the respective partial derivatives of $F^*(\mathcal{I})|_{g^t,k^t}$ to zero. These partial derivatives are given by $$\frac{\partial F^*(\mathcal{I})|_{g^t,k^t}}{\partial L(\lambda_i)} = -2 \sum_{P \in \mathcal{P}} \sum_{u \in P} (I(\lambda_i, u) - g^t(u) D_P(\lambda_i) - k^t(u) L(\lambda_i)) k^t(u)$$

$$\frac{\partial F^*(\mathcal{I})|_{g^t,k^t}}{\partial D_P(\lambda_i)} = -2 \sum_{u \in P} (I(\lambda_i, u) - g^t(u) D_P(\lambda_i) - k^t(u) L(\lambda_i)) g^t(u)$$

Equating the above equations to zero, we obtain $$L(\lambda_i) = \frac{\sum_{P \in \mathcal{P}} \sum_{u \in P} [k^t(u) I(\lambda_i, u) - g^t(u) k^t(u) D_P(\lambda_i)]}{\sum_{P \in \mathcal{P}} \sum_{u \in P} (k^t(u))^2} \quad (13)$$

$$D_P(\lambda_i) = \frac{\sum_{u \in P} [g^t(u) I(\lambda_i, u) - g^t(u) k^t(u) L(\lambda_i)]}{\sum_{u \in P} (g^t(u))^2} \quad (14)$$

From Equations 13 and 14, the illuminant spectrum can be solved in closed form as $$L^*(\lambda_i) \frac{\sum_{P \in \mathcal{P}} \sum_{u \in P} k^t(u) I(\lambda_i, u) - \sum_{P \in \mathcal{P}} \left[ \frac{\left(\sum_{u \in P} g^t(u) k^t(u)\right)\left(\sum_{u \in P} g^t(u) I(\lambda_i, u)\right)}{\sum_{u \in P} (g^t(u))^2} \right]}{\sum_{P \in \mathcal{P}} \sum_{u \in P} (k^t(u))^2 - \sum_{P \in \mathcal{P}} \left[ \frac{\left(\sum_{u \in P} g^t(u) k^t(u)\right)^2}{\sum_{u \in P} (g^t(u))^2} \right]} \quad (15)$$

2.4 Shading, Reflectance and Specularity Recovery

Note that, in the optimisation scheme above, we recover the geometric variables for pixels in each patch $P \in \mathcal{P}$ used for the recovery of the illuminant spectrum. This implies that, whereas we have only computed the variables g(u), k(u) and S(.,u) for pixel-sites $u \in P$, we have also recovered the illuminant spectrum L. Since L is a global photometric variable in the scene, we can recover the remaining dichromatic variables making use of L in a straightforward manner. The remaining dichromatic variables include shading g, reflectance s and specularity k factors at each pixel.

For this purpose, we assume the input scene is composed of smooth surfaces with slowly varying reflectance. In other words, the neighbourhood of each pixel can be regarded as a locally smooth patch made of the same material, i.e. all the pixels in the neighbourhood share the same spectral reflectance. Given the illuminant spectrum L, we can obtain the shading g, specularity k and reflectance s of the neighbourhood at the pixel of interest by applying the procedure corresponding to line 4 in Algorithm 1 of FIG. 2. This corresponds to the application of the first of the two steps used in the optimisation method presented in the section above.

The pseudocode of this method is summarised in Algorithm 2 shown in FIG. 3. Note that the assumption of smooth surfaces with slowly varying reflectance is applicable to a large category of scenes where surfaces have a low degree of texture or across edges and near occlusion. Following this assumption, the reflectance at each pixel is recovered as the shared reflectance of its surrounding neighbourhood 106. To estimate the shading and specularity 108, one can apply the closed-form formulae of these, as shown in Equations 8 and 9. These formulae yield exact solutions in the ideal condition, which requires that all the pixel radiance vectors lie in the same dichromatic hyperplane spanned by the illuminant spectrum L and the diffuse radiance vector D.

However, in practice, it is common for multi-spectral images to contain noise which breaks down this assumption and renders the above quotient expressions numerically unstable. Therefore, to enforce a smooth variation of the shading factor across pixels, we recompute 108 the shading g and specularity k coefficients after obtaining the spectral reflectance s 106. This is due to the observation that the reflectance spectrum is often more stable than the other two variables, i.e. shading g and specularity k factors. Specifically, one can compute the shading g and specular k coefficients as those resulting from the projection of pixel radiance I(u) onto the subspace spanned by the illuminant spectrum L and the diffuse radiance spectrum vectors D.

This framework breaks down when dichromatic hyperplane assumption is violated, i.e. the illuminant spectrum L is co-linear to the diffuse radiance spectrum D of the material. This renders the subspace spanned by the radiance spectra of the patch pixels to collapse to a 1-dimensional space. Consequently, a Singular Value Decomposition (SVD) of these radiance spectra does not succeed in finding two basis vectors of the subspace. Since the diffuse component D is a product of the illuminant power spectrum and the material reflectance, this condition implies that the material has a uniform spectral reflectance. In other words, the failure case only happens when the input scene contains a single material with a uniform reflectance, i.e. one that resembles a shade of gray.

This failure case is very rare in practice. In fact, when the scene contains more than one material, as more uniform albedo patches are sampled from the scene, there are more opportunities to introduce the non-collinearity between the illuminant spectrum L and surface diffuse radiance D spectrum. In short, our method guarantees the recovery of dichromatic model parameters L, g, s, and k on scenes with more than one distinct albedo.

3 Imposing Smoothness Constraints (See FIG. 21, 100(a))

Here we show how smoothness constraints may be imposed upon the optimisation process.

Above we addressed the need of enforcing the smoothness constraint on the shading field $g=\{g(u)\}_{u\in I}$ using the regularisation term R(u) in Equation 2. In Equation 3, we present a regulariser that encourages the slow spatial variation of the shading field. There are two reasons for using this regulariser in the optimisation framework introduced in the previous sections. Firstly, it yields a closed-form solution for the surface geometry and reflectance, given the illuminant spectrum. Secondly, it is reminiscent of smoothness constraints imposed upon shape from shading approaches and, hence, it provides a link between other methods in the literature, such as that in [58] and the optimisation method described above. However, we need to emphasise that the optimisation procedure above by no means implies that the framework is not applicable to alternative regularisers. In fact, our target function is flexible in the sense that other regularisation functions can be employed dependent on the surface at hand.

We introduce a number of alternative regularisers on the shading field that are robust to noise and outliers and adaptive to the surface geometry variation. To this end, we commence by introducing robust regularisers. We then present extensions based upon the surface curvature and the shape index.

To quantify the smoothness of shading, an option is to treat the gradient of the shading field as the smoothness error. In Equation 3, we introduced a quadratic error function of the smoothness. However, in certain circumstances, enforcing the quadratic regulariser as introduced in Equation 2 causes the undesired effect of oversmoothing the surface, see [11, 31] in the field of Shape from Shading.

As an alternative, we utilise kernel functions stemming from the field of robust statistics. Formally speaking, a robust kernel function $\rho_\sigma(\eta)$ quantifies an energy associated with both the residual $\eta$ and its influence function, i.e. measures sensitivity to changes in the shading field. Each residual is, in turn, assigned a weight as defined by an influence function $\Gamma_\sigma(\eta)$. Thus the energy is related to the first-moment of the influence function as $$\frac{\partial \rho_\sigma(\eta)}{\partial \eta} = \eta \Gamma_\sigma(\eta).$$

Table 1 of FIG. 4 shows the formulae for Tukey's bi-weight [26], Li's Adaptive Potential Functions [38] and Huber's M-estimators [30].

3.1 Robust Shading Smoothness Constraint

Having introduced the above robust estimators, we proceed to employ them as regularisers for the target function. Here, several possibilities exist. One of them is to directly minimise the geometric variation by defining robust regularisers with respect to the shading gradient. In this case, the regulariser R(u) is given by the following formula $$R(u) = \rho_\sigma\left(\left|\frac{\partial g}{\partial x}\right|\right) + \rho_\sigma\left(\left|\frac{\partial g}{\partial y}\right|\right) \tag{16}$$

Despite effective, the formula above still employs the gradient of the shading field as a measure of smoothness.

3.2 Curvature Consistency

Here we explore the use of curvature as a measure of consistency. One can instead consider the intrinsic characteristics of the surface at hand given by its curvature. Specifically, Ferrie and Lagarde [17] have used the global consistency of principal curvatures to refine surface estimates in Shape from Shading. Moreover, ensuring the consistency of curvature directions does not necessarily imply a large penalty for discontinuities of orientation and depth. Therefore, this measure can avoid oversmoothing, which is a drawback of the quadratic smoothness error.

The curvature consistency can be defined on the shading field by treating it as a manifold. To commence, we define the structure of the shading field using its Hessian matrix $$H = \begin{pmatrix} \frac{\partial^2 g}{\partial x^2} & \frac{\partial^2 g}{\partial x \partial y} \\ \frac{\partial^2 g}{\partial x \partial y} & \frac{\partial^2 g}{\partial y^2} \end{pmatrix}$$

The principal curvatures of the manifold are hence defined as the eigenvalues of the Hessian matrix. Let these eigenvalues be denoted by $k_1$ and $k_2$, where $k_1 \geq k_2$. Moreover, we can use the principal curvatures to describe local topology using the Shape Index [34] defined as follows $$\phi = \frac{2}{\pi}\arctan\left(\frac{k_1 + k_2}{k_1 - k_2}\right) \tag{17}$$

The observation above its important because it permits casting the smoothing process of the shading field as a weighted mean process, where the weight assigned to a pixel is determined by the similarity in local topology, i.e. the shape index, about a local neighbourhood. Effectively, the idea is to favour pixels in the neighbourhood that belong to the same or similar shape class as the pixel of interest. This is an improvement over the quadratic smoothness term defined in Equation 3 because it avoids the indiscriminate averaging of shading factors across discontinuities. That is, it is by definition edge preserving.

For each pixel u, we consider a local neighbourhood N around u and assign a weight to each pixel u* in the neighbourhood as $$w(u^*) = \exp\left(-\frac{(\phi(u^*) - \mu_\phi(N))^2}{2\sigma_\phi^2(N)}\right),$$

where $\mu_\phi(N)$ and $\sigma_\phi(N)$ are the mean and standard deviation of shape index over the neighbourhood N. Using this weighting process, we obtain an adaptive weighted mean regulariser as follows $$R(u) = \left(g(u) - \frac{\sum_{u^* \in N} w(u^*) g(u^*)}{\sum_{u^* \in N} w(u^*)}\right)^2 \quad (18)$$

This approach can be viewed as an extension of the robust regulariser function with a fixed kernel, presented in Equation 16. To regulate the level of smoothing applied to a neighbourhood, we consider the shape index statistics [34] so as to adaptively change the width of the robust kernel. The rationale behind adaptive kernel widths is that a neighbourhood with a great variation of shape index requires stronger smoothing than one with a smoother variation. The regulariser function is exactly the same as Equation 16, except for the kernel width which is defined pixel-wise as $$\sigma(u) = \exp\left(-\left(\frac{1}{K_\phi |N|} \sum_{u^* \in N} (\phi(u^*) - \phi(u))^2\right)^{\frac{1}{2}}\right) \quad (19)$$

where N is a neighbourhood around the pixel u, |N| is the cardinality of N and $K_\phi$ is a normalisation term.

With the above formulation of the kernel width, it can be observed that a significant variation of the shape index within the neighbourhood corresponds to a small kernel width, causing the robust regulariser to produce heavy smoothing. In contrast, when the shape index variation is small, a lower level of smoothing occurs due to a wider kernel width.

Note that the use of the robust regularisers introduced earlier in this section as an alternative to the quadratic regulariser does not preclude the applicability of the optimisation framework described in Section 2.3.2. In fact, the change of regulariser only affects the formulation of the target function in Equation 10, in which the shading factor g(u) can be expressed as a univariate function as given in Equation 8. Since all the above robust regularisers are only dependent on the shading factor, the resulting target function is still a function of the variable $$r \triangleq \frac{1}{w_2 v - w_1}.$$

Further, by linearisation of the robust regularisers, one can still numerically express the regulariser as a quadratic function of the r variable. Subsequently, the closed-form solution presented earlier stands as originally described.

4 Adaptation to Trichromatic Imagery—Example 2

We provide here a link between Example 1 above, which is hyperspectral in nature, and trichromatic imagery of this Example. That is we show how to utilise the optimisation method above to recover the dichromatic parameters from trichromatic images.

We transform the dichromatic model for multispectral images into one for trichromatic imagery. Let us denote the spectral sensitivity function of the trichromatic sensor c (where c∈{R, G, B}) by $C_c(\lambda)$. The response of the sensor c to the spectral irradiance arriving at the location u is given by $I_c(u) = \int_\Omega E(\lambda, u) C_c(\lambda) d\lambda$, where $E(\lambda, u)$ is the image irradiance and Q is the spectrum of the incoming light. Furthermore, it is well-known that the image irradiance is proportional to the scene radiance $I(\lambda, u)$, i.e. $E(\lambda, u) = K_{opt} \cos^4 \beta(u) I(\lambda, u)$, where $\beta(u)$ is the angle of incidence of the incoming light ray on the lens and $K_{opt}$ is a constant only dependent on the optics of the lens [28]. Hence, we have $$I_c(u) = K_{opt} \cos^4 \beta(u) \int_\Omega I(\lambda, u) C_c(\lambda) d\lambda$$

$$= K_{opt} \cos^4 \beta(u) \int_\Omega (g(u) L(\lambda) S(\lambda, u) + k(u) L(\lambda)) C_c(\lambda) d\lambda$$

$$= K_{opt} \cos^4 \beta(u) \int_\Omega L(\lambda) S(\lambda, u) C_c(\lambda) d\lambda +$$

$$K_{opt} \cos^4 \beta(u) k(u) \int_\Omega L(\lambda) C_c(\lambda) d\lambda$$

$$= g^*(u) D_c(u) + k^*(u) L_c$$

where $g^*(u) = K_{opt} \cos^4 \beta(u) g(u)$ and $k^*(u) = \cos^4 \beta(u) k(u)$.

Here we notice that $D_c(u) = \int_\Omega L(\lambda) S(\lambda, u) C_c(\lambda) d\lambda$ and $L_c = \int_\Omega L(\lambda) C_c(\lambda) d\lambda$ are the c component of the surface diffuse colour corresponding to the location u and of the illuminant colour, respectively.

The dichromatic cost function for the trichromatic image I of a scene is formulated as $$F(I) \triangleq \sum_{u \in I} \left[\sum_{c \in \{R,G,B\}} [I_c(u) - (g^*(u) D_c(u) + k^*(u) L_c)]^2 + \alpha R(u)\right] \quad (20)$$

where R(u) is a spatially varying regularisation term, as described in Equation 2.

The cost function in Equation 20 is a special case of Equation 2, where n=3. Hence, the method of recovering the dichromatic parameters, as elaborated above can be applied to this case in order to recover the trichromatic diffuse colour $D(u) = [D_R(u), D_G(u), D_B(u)]^T$ and illuminant colour $L = [L_R, L_G, L_B]^2$, as well as the shading and specular factors g(u) and k(u) up to a multiplicative factor.

5 Implementation

We illustrate here the utility of the method for purposes of illuminant spectrum recovery, highlight removal and skin segmentation 124.

Figure 25:
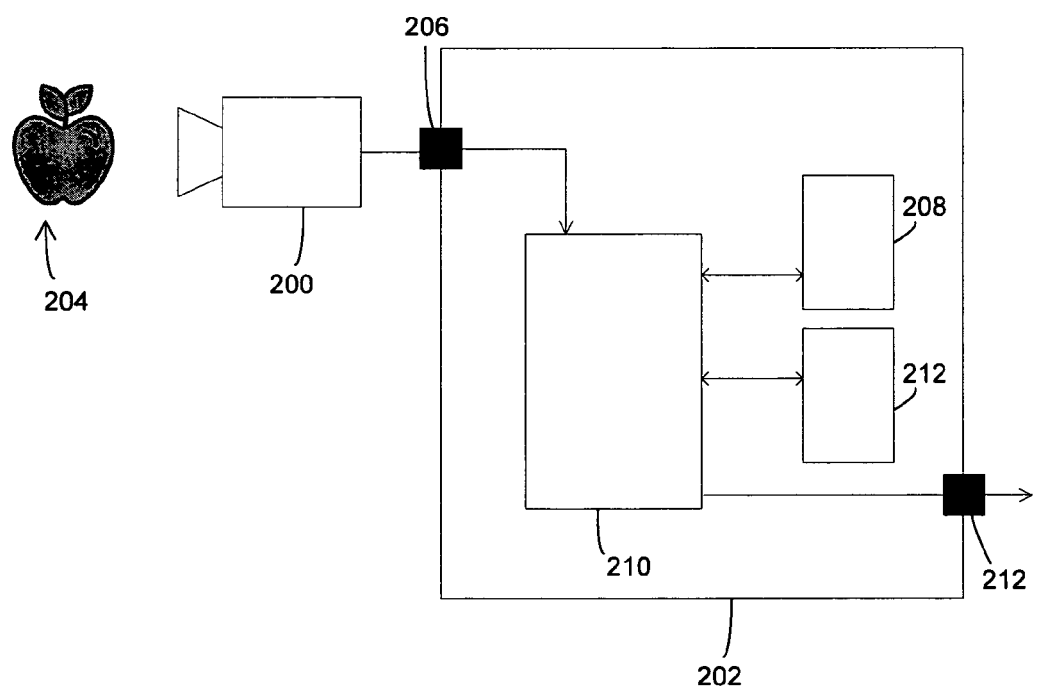
FIG. 25 is an example computer system able to implement the methods described.

Implementation may be on the computer system shown on FIG. 25. In this computer system is comprised of a sensor 200 and a computer 202.

In this example the sensor 200 is a hyperspectral camera that is able to capture an image of a scene 204 and provide that digital image to an input port 206 of the computer 202. The camera may have a number of bands that balances computational costs with accuracy. The camera may have as low as five bands and as high as hundreds. The received image is stored in local memory 208 by the processor. The image may be stored and used in this method in the compact representation form as described in WO 2009/152583. The processor 210 is able to perform the methods shown in FIGS. 21 to 24 on the received image. This may comprise reference to a database 212 of previously stored and analysed hyperspectral images. In this example the database 212 is local to the computer 212, but alternatively could be remote to the computer 200. In a further alternative, the computer 202 may be incorporated into the camera 200.

The outcome of the any one or more of the methods of FIGS. 21 to 24, being
 (i) the illumination spectrum of the image,
 (ii) the surface reflectance, surface shading and specularity of the points in the image,
 (iii) identification of selected sub-images;
 (iv) a modified version of the image; or
 (v) an material identification indication, is then provided as output to an output port 212. This output port 212 may be connected to an output device, such as a display device or printer. Alternatively, it may be connected to a further computer system, either local or remote, that is able to perform further methods on the received output, or simply connected to storage device.

The method is implemented on a number of image databases so as to verify the accuracy of the recovered dichromatic parameters. Our datasets include indoor and outdoor, multispectral and RGB images with uniform and cluttered backgrounds, under natural and artificial lighting conditions. For this purpose, we have acquired in-house two multi-spectral image databases captured in the visible and near-infrared spectra. These consist of indoor images taken under artificial light sources and outdoor images under natural sunlight and skylight. From these two databases, two trichromatic image databases are synthesized for the spectral sensitivity functions of a Canon 10D and a Nikon D70 camera sensor and the CIE standard RGB colour matching functions [15]. Apart from these databases, we have also compared the performance of our algorithm with the alternatives on the benchmark dataset reported by Barnard et al. in [3].

The indoor database includes images of 51 human subjects, each captured under one of 10 directional light sources with varying directions and spectral power. The light sources are divided into two rows. The first of these placed above the camera system and the second one at the same height as the cameras. The main direction of the lights is adjusted so as to point towards the centre of the scene. The imagery has been acquired using a pair of OKSI Turnkey Hyperspectral Cameras. These cameras are equipped with Liquid Crystal Tunable Filters which allow multispectral images to be resolved up to 10 nm in both the visible (430-720 nm) and the near infrared (650-990 nm) wavelength ranges. To obtain the ground truth illuminant spectrum for each image, we have measured the average radiance reflected from a white calibration target, i.e. a LabSphere Spectralon, illuminated by the light sources under consideration. Using the same camera system and calibration target, we have captured the outdoor images of a paddock from four different viewpoints, each from seven different viewing angles at different times of the day.

5.1 Illumination Spectrum Recovery

For our experiments on illumination spectra recovery, we compare the results yielded by our method to those delivered by the colour constancy method proposed by Finlayson and Schaefer [21]. Note that the method in [21] can be viewed as a least squares solution of the cost function in Equation 2 (See FIG. 21, 100($c$)), where the illuminant colours are estimated based on the dichromatic model without prior assumptions on the illuminant statistics. Although their experiments were performed on trichromatic imagery, this method can be adapted to multispectral data in a straightforward manner. Their approach relies on the dichromatic plane hypothesis. This is, that the dichromatic model implies a two-dimensional colour space of pixels in patches with homogeneous reflectance. Utilising this idea, illumination estimation is cast as an optimisation problem so as to maximise the total projection length of the light colour vector on all the dichromatic planes. Geometrically, this approach predicts the illuminant colour as the intersection of dichromatic planes, which may lead to a numerically unstable solution when the angle between dichromatic planes are small.

Finlayson and Schaefer's method can be adapted to multispectral images as follows. First, we employ our automatic patch selection method to provide homogeneous patches as input for their colour constancy algorithm. Secondly, we solve the eigen-system of the sum of projection matrices on the dichromatic planes. The light colour vector is the eigenvector corresponding to the largest eigenvalue.

The other alternative used here is akin to the spectrum deconvolution approach proposed by Sunshine et al. [52] to recover the absorption bands characteristic to the surface material chemistry. This method makes use of the upper-bound envelope of a reflectance spectrum, also known as its continuum, which can be regarded as a reflectance spectrum without any absorption feature. For illuminant recovery, we view the estimated illuminant spectrum as the continuum of the radiance spectra at all the pixels. The work in [52] assumes that the continuum is a linear function of the wave number, i.e. the reciprocal of wavelength, on the log reflectance scale. Making use of this assumption, it then fits this parametric form to the continuum of the radiance spectra to recover the illuminant. Note that the resulting illuminant does not rely on patch selection and is therefore independent of the number of patches.

We commence by providing results on hyperspectral imagery. We then turn our attention to light colour recovery in trichromatic imagery. We conclude the section by providing a noise perturbation analysis.

5.1.1 Multispectral Light Spectrum Recovery

As mentioned above, we first focus our attention on the use of our dichromatic parameter recovery algorithm for illuminant spectrum estimation in hyperspectal imagery. To this end, we have performed experiments using 1, 5, 10, 20, 30, 40 and 50 automatically selected patches of regular albedo. Each patch has a size of 20×20 pixels. The accuracy of light spectrum recovery is measured as the Euclidean deviation angle between the estimated and ground truth spectrum in n dimensions, where n is the number of sampled wavelengths. These results are then compared against those obtained by the method of Finlayson and Schaefer [21] and Sunshine et al's [52] on the same number of patches.

Table 2 in FIG. 5 shows the mean and standard deviation of the angular error, in degrees, over all images in the indoor face database versus the number of selected patches in both the visible and infrared spectral ranges. Similar statistics are plotted in FIG. 6, with the mean and standard deviation of the angular errors represented by the midpoint and the length of the error bars. That is FIG. 6 shows the accuracy versus the number of patches used in our illumination estimation method on the multispectral facial image database, in degrees, compared to Finlayson and Schaefer's method (F & S) and Sunshine et al.'s method. The results for both the visible (left) and the near-infrared ranges (right) are shown. Again, note that the method of Sunshine et al. [52] is independent of the number of the selected patches.

The results are reported with a weight $\alpha=100000$ assigned to the regularisation term in Equation 2. In this experiment, the regularisation term is defined to be the smoothness of shading variation, as shown in Equation 3. To obtain an optimal value of $\alpha$, we perform a procedure similar to the grid search employed in cross validation. The procedure involves applying our algorithm on a randomly sampled portion of the database several times for different parameter values and then selecting the value that yields the highest overall performance.

As shown in Table 2 of FIG. 5, our algorithm achieves a higher accuracy than the alternative methods when using no more than 20 homogeneous patches for both spectral ranges. Table 2 shows the accuracy versus the number of patches used for our illuminant estimation method on the multispectral facial image database captured under both the visible and near-infrared spectra, in degrees, compared to Finlayson and Schaefer's method (F & S) and Sunshine et al's method.

It is noticeable that even with a single patch, our method still significantly outperforms Finlayson and Schaefer's method [21]. This observation is consistent with the well-known fact that the dichromatic plane method and its variants require at least two homogeneous surfaces to compute the intersection between the dichromatic planes. In addition, the angular error of the estimated illuminant decreases as the number of patches increases from 1 to 5. However, as the number of patches grows beyond 5, the angular error of our method tends to increase. Although our methods remains more accurate than Finlayson and Schaefer's method in the visible range, its accuracy is slightly lower than the latter with more than 20 patches in the near-infrared range. Nonetheless, our method is able to achieve a reasonable estimate with a small number of homogeneous patches. Lastly, we can conclude that Sunshine et al.'s method [52] is, in general, inferior to the other two.

This example provides a margin of accuracy improvement with an increasing number of patches. Or example outperforms the alternatives in computing the infra-red light spectrum. Meanwhile, its performance is comparable to Finlayson and Schaefer's [21] in the visible range and is better than Sunshine et al's method [52]. Moreover, our method is more robust than the others even when it uses a single homogeneous patch for light estimation.

In Table 3 of FIG. 7 and FIG. 8, we show the accuracy of the recovered spectrum of natural sunlight illuminating the outdoor scene in our dataset. Here our algorithm is applied with a regularisation weight $\alpha=10000000$. In this case, our method delivers a slight improvement over Finlayson and Schaefer's [21] when using more than 20 randomly selected patches. Using between 5-15 patches, the two algorithms achieve similar accuracy and error variance across the whole database. As before, our algorithm significantly outperforms the alternative methods in the case of a single uniform albedo patch. FIG. 8 also illustrates the stability of our method with respect to the increase in the number of selected patches. It is also noticeable that the accuracy of all the algorithms for the outdoor image database is lower than that for the face database due to a wider variation of spectral radiance across the scene.

5.1.2 Trichromatic Light Recovery

Next, we turn our attention to the utility of our parameter recovery method for the purpose of illuminant colour estimation from trichromatic images. To this end, we generate RGB imagery from the multispectral face and outdoor databases mentioned previously. These are synthesized by simulating a number of trichromatic spectral responses, including the CIE-1932 colour matching functions [15] and the camera sensors for a Nikon D70 and a Canon 10D. Furthermore, we apply our method and the alternatives to the Mondrian and specular image datasets as described by Barnard et al [4]. We also compare the performance of our algorithm with several colour constancy approaches described in [3] by the same authors.

To illustrate the effect of varying the value of $\alpha$, we effect experiments with $\alpha=1000$ and $\alpha=100$. In Table 4 of FIG. 9 and FIG. 10 we show results for the light estimation accuracy on the RGB face images with $\alpha=10000$ and a patch size of 20×20 pixels. Our method outperforms the alternatives in terms of estimation accuracy and stability when the number of patches (or the number of available intrinsic colours in the scene) is 5 or less. Another general trend is that our method and Finlayson and Schaefer's [21] one improve their accuracy as the number of selected patches increases. However, this improvement is marginal for our method when we use 20 or more patches. Meanwhile, the method of Finlayson and Schaefer [21] tends to achieve a closer estimate to the groundtruth when it is applied on a sufficiently large number of patches from the images synthesized for the Canon 10D and Nikon D70 sensors. Interestingly, for images simulated for the colour matching functions, which emulate the human visual perception, our method achieves a similar accuracy to Finlayson and Schaefer's [21] across all the number of selected patches, while being more stable (with lower variance of angular error). In all our experiments, the approach of Sunshine et. at [52] is the one that delivers the worst performance.

Table 5 of FIG. 11 and FIG. 12 show the accuracy of the illuminant colour estimation on the outdoor RGB image database, with $\alpha=100$ and a patch size of 20×20 pixels. The major trend of these statistics is that our method achieves an accuracy significantly higher than those achieved by the others. The difference in performance is in the order of several standard deviations of the angular error. While the performance of our method is slightly degraded as the number of patch increases (above 20), the stability of the estimate remains constant for Canon 10D and Nikon D70 images, and even improves for the images simulated for the CIE 1932 standard colour matching functions. It is also important to notice that our method performs better on the imagery synthetised using the CIE 1932 standard. This is consistent with the results reported for the ROB face images. Overall, our method appears to outperform the alternatives when applied to cluttered scenes with a high variation in colour and texture.

Next, we turn our attention to the illuminant estimation accuracy on the Mondrian and specular image datasets reported in [4]. To account for the level of texture density in some of the images, we choose a patch size of 10×10 pixels, which is small enough so that the assumption of uniform albedo across each patch still holds. In this experiment, a patch is regarded to be of homogeneous reflectance if 75% or more of the patch pixels deviate by less than 1 degree from their projection on the dichromatic plane of the patch. We also enforce a criterion that precludes the selection of highly contrasting patches containing more than one intrinsic colour and those containing saturated pixels due to highlights. Specifically, we rank patches in an image by their contrast levels and select the most contrasting ones, excluding those in the top 10% in each image of the Mondriant dataset. For the specular dataset, we exclude the top 30% percent of the patches in each image to accommodate to a higher level of colour saturation.

Figure 14:
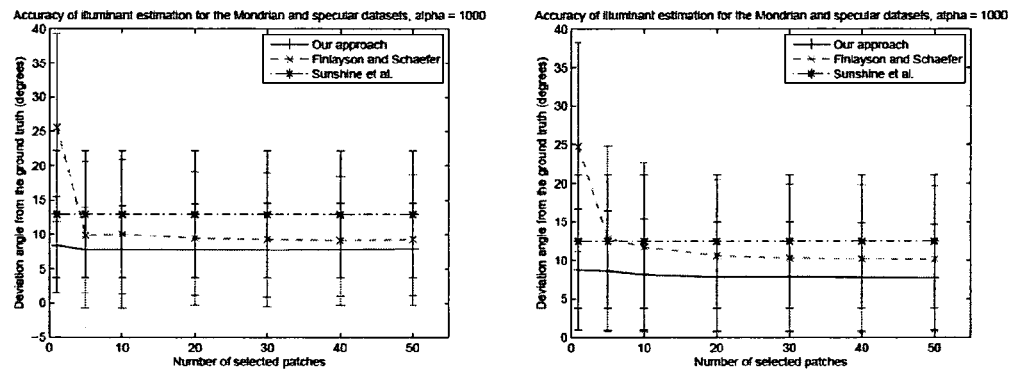
FIG. 14 graphically shows accuracy of our illuminant estimation example with $\alpha$=1000 for the Mondrian and specular datasets with 8-bit and 16-bit dynamic ranges, as reported in [4]. Our method is compared to that of Finlayson and Schaefer (F & S) and Sunshine et al.

In Table 6 of FIG. 13 and FIG. 14, we show the accuracy when 1, 5, 10, 20, 30, 40 and 50 patches are used.

Our results are consistent with previous experiments, which shows that our method outperforms the Finlayson and Schaefer's method on both the datasets with 8-bit standard dynamic range and 16-bit extended dynamic range. This is reflected not only by a lower mean of angular error yielded by our method, but also a lower standard deviation of its performance. In addition, our method delivers a variance of angular error which is almost constant with 5 or more selected patches. Further, the performance of our method improves slightly with more selected patches when running on the 16-bit dataset instead of the 8-bit dataset. To some extent, our estimator appears to be insensitive to the dynamic range of the input image. This shows that our method is more stable and robust to variations in the scene reflectance. In comparison to the benchmark methods reported by Barnard et al. [3], our method ranks second, just below the gamut mapping methods presented in [23]. The methods in [23] deliver an accuracy between 5:6-7:1 degrees for the 16-bit images and 6:3-8:3 degrees for the 8-bit images, as shown in Table II in [3]. However, these results were reported for imagery that had already undergone several processing steps including segmentation, scaling and clipping operations. On the other hand, our method does not require any preprocessing and, moreover, it is capable of recovering all the dichromatic-model parameters being applicable to hyperspectral imagery with trichromatic as a particular case.

5.1.3 Noise Perturbation Analysis

Figure 15:
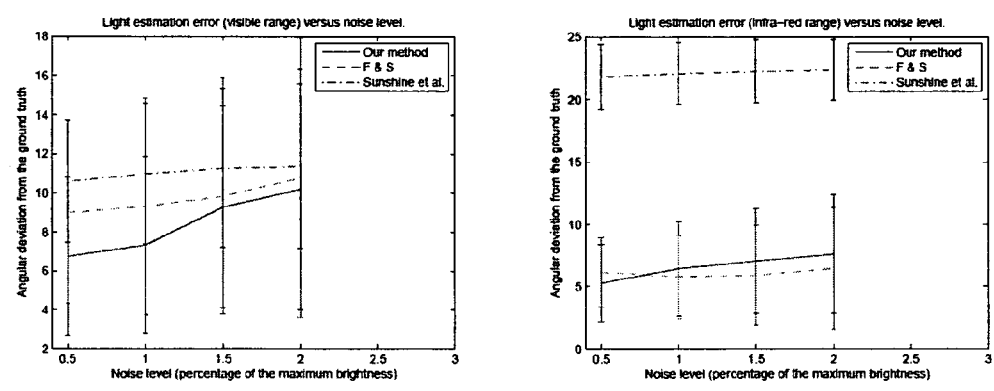
FIG. 15 graphically shows the accuracy of the estimated illuminant spectra versus the standard deviation of Gaussian noise. The vertical axis shows the angular deviation of the estimated spectra from the corresponding ground-truth, while the horizontal axis shows the standard deviation of Gaussian noise as the percentage of maximum brightness of the imagery. The performance for the visible spectrum is shown in the left-hand image, while that corresponding to the infra-red spectrum is shown on the right-hand panel.

We examine the robustness of our algorithm to added image noise. To do this, we perturb the multispectral face image database with various levels of additive Gaussian noise. The noise has an increasing standard deviation between 0:5 and 2% of the maximum image brightness, with increments of 0.5%. In FIG. 15, we plot the performance of our algorithm and the alternatives across various levels of noise, in the visible (left-hand panel) and infra-red (right-hand panel) spectrum. For our algorithm and Finlayson and Schaefer's one [21], we employ all the homogenous patches recovered from the images. The regularisation weight for our method is $\alpha=100000$. As shown in the figure, our method achieves a lower mean deviation angle than the other two in the visible spectrum, with a more stable estimation than that delivered by the method in [21]. Moreover, in the infra-red spectrum, our method greatly outperforms Sunshine et al's [52] by more than two standard deviations of the angular error in the recovered illuminant spectra.

On the degradation in performance with an increasing level of noise, the Sunshine et al's method is most stable because it considers the upper bound of all the radiance spectra in an image, which is lesser affected by the level of Gaussian noise. However, it is the least accurate method of the three alternatives. Ours and Finlayson & Schaefer's appear to degrade linearly with the level of noise, although the latter one degrades at a slower rate than our method. This can be explained by the fact that Finlayson & Schaefer's method relies on an eigenvalue decomposition, which is equivalent to our method with a zero-regularisation term. Albeit obtaining a more robust solution for the illuminant, their method does not take surface geometry and highlights into account. Not only can our approach estimate the illuminant spectrum, it is also capable of computing all the dichromatic parameters, while maintaining a reasonable estimation using regularisation.

5.2 Highlight Detection/Removal

Having estimated the illuminant spectra, and, as mentioned previously, we can employ the procedure described above to separate the diffuse from the specular components of the reflectance in multi-spectral imagery. This is feasible in situations where the spectral reflectance varies slowly within a small spatial neighbourhood of the scene. Note that this assumption is a valid one for many real-world surfaces. Thus, each local neighbourhood can be considered as a smooth homogeneous surface. As a result, the geometry-dependent diffuse component at a location u in patch P is estimated as $\hat{D}(u)=g(u)(L \cdot S_P)$. The specularity component is given by $k(u)L$.

Here, we perform highlight removal on the indoor human face image database presented earlier. As mentioned in previous sections, we commence by estimating the illuminant spectra. We consider a neighbourhood of size 11×11 around each image pixel and assume that the neighbourhood has a common reflectance. As discussed in above, a practical enforcement of smooth variation of the shading factor entails reprojecting the pixel radiance onto the subspace spanned by the illuminant spectrum and the diffuse radiance spectrum vectors. In this experiment, we employ a projection that minimises the $L_2$-norm of the distance between pixel radiance and this two-dimensional subspace.

Figure 16:
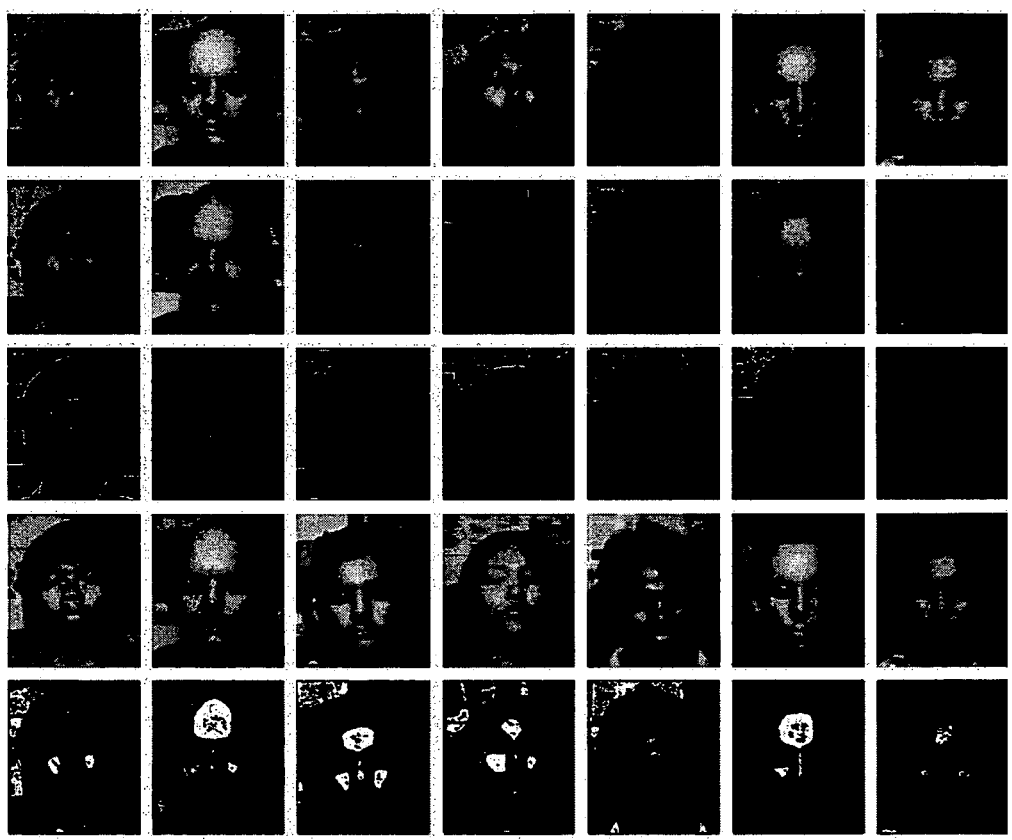
FIG. 16 shows highlight removal results. First row: original images captured at 670 nm. Second row: the corresponding shading maps produced by our method. Third row: the corresponding specularity images produced by our method. Fourth row: the shading maps produced by Ragheb and Hancock's method [46]; Fifth row: the specularity maps produced by Ragheb and Hancock's method [46].

FIG. 16 shows the resulting shading and specularity coefficients estimated for a number of sample face images in the dataset. The top row shows the input images illuminated from a high oblique light direction. The second and third rows show the shading and specular coefficients, respectively, as yielded from our estimation method. The last two rows show the same results as produced by the alternative highlight removal method in [46]. The alternative uses a probabilistic framework based upon the statistics arising from Lambertian reflectance in diffuse illumination. Note that the alternative is only applicable to a single-band grey scale image compliant with the Lambertian model. Thus, to compare the two methods, we apply the alternative to the brightest band in each of the input images. Also, in order to comply with the assumptions in [46] regarding collinearity of the light and viewer directions, we have applied the alternative to face imagery in the dataset where the camera and the illuminant directions are linearly dependent.

As observed from FIG. 16, our method is successful at detecting and separating the specular from the diffuse component at typical highlight locations, such as noses, eyelids and foreheads. In addition, our method produces smooth matte diffuse images that capture the variation in the geometry of faces. Note that our method does not require the illumination direction a priori. On the other hand, the method of Ragheb and Hancock [46] assumes the coincidence of the illumination and viewing directions. Therefore, it cannot cope with the application setting shown for our method, where the light source is placed at a high-oblique position with respect to the camera. As expected, the alternative tends to miss important highlight points and generates false specular spikes.

Since our method makes the uniform albedo assumption on input surface patches, it tends to generate highlights in highly textured areas and along material boundaries. However, note that fine-scale relief texture of rough and highly textured areas may cause specularity that is only detected by elaborate measurements, as discussed in the work of Wang and Dana [57]. Since the background of the multispectral images in FIG. 10 may be viewed as textured regions in the images, it may give rise to the highlights detected by our method, as shown in the third row of FIG. 16.

Now we turn our attention to the application of our method to specularity detection and removal on trichromatic images. We compare the performance of our method with another highlight removal method [40] which employs a partial differential equation to erode the specularity at each pixel.

Figure 17:
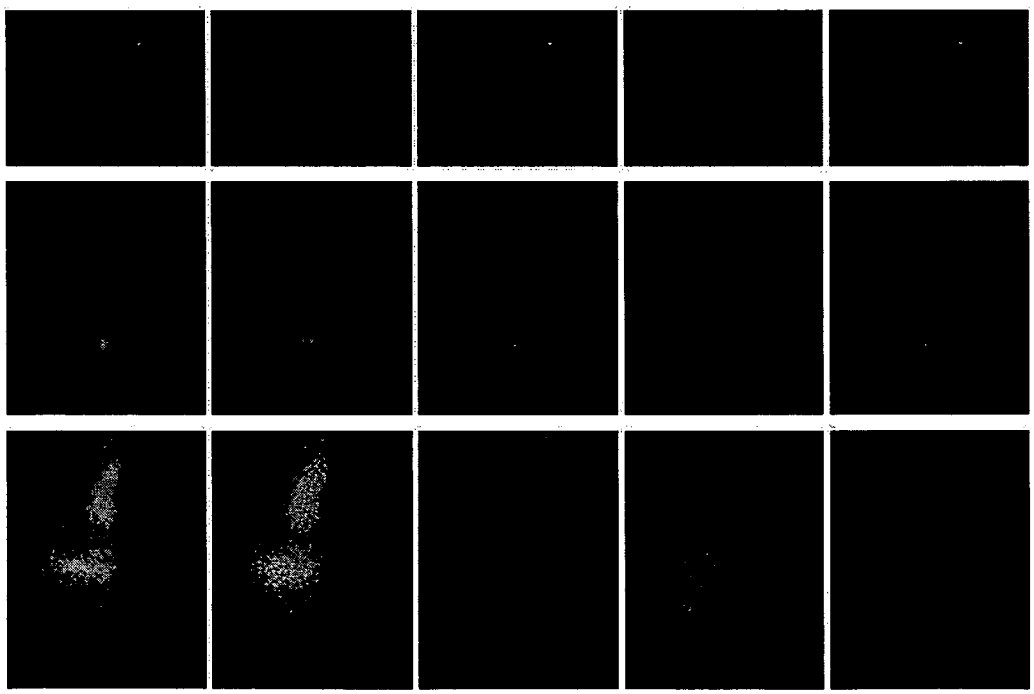
FIG. 17 shows a comparison between the highlight removal results of our method and that by Mallick et al. [40]. First column: the input image. Second and third columns: the diffuse and specular components resulting from our method. Fourth and fifth columns: the diffuse and specular components yielded by Mallick et al.'s method.

In FIG. 17, we compare our method with the highlight removal method by Mallick et al. [40]. As before, our method performs better on smooth, homogeneous surfaces than on textured areas, such as those in the second and third rows. On the smooth surfaces, most of the specular spikes are detected by our method, although there may be false specularities along the occlusion boundaries and material boundaries. On the other hand, the alternative produces smoother diffuse components, which are more intuitively correct. In addition, it detects more specular pixels on smooth surfaces.

As can be seen in FIG. 17, our method is able to detect the expected specular spikes, as shown in the third column. Note that our method may introduce undesirable specularities along edges. This can be observed in the specularity maps in the third row. This is because patches at these locations are not of uniform albedo. Notably, the specularity map in the second row shows the underlying texture variation of the pear, which may be the cause of specularity being scattered over the fruit skin. In the second column, we show the diffuse component recovered by our method, where the diffuse colours at specular points are approximated from the neighbouring non-specular pixels.

5.3 Skin Segmentation

Finally, we turn our attention to the illumination invariance of the spectral reflectance recovered by our algorithm and its applications to recognition tasks. Specifically, we focus on using the spectral image reflectance extracted by the method above for skin recognition. This task can be viewed as a classification problem where the skin and non skin spectra comprise positive and negative classes, respectively. In this manner, we can assert the robustness and consistency of both the illuminant spectrum and surface reflectance recovered by our algorithm at training time, and those yielded by the method for skin recognition at the testing phase.

In this experiment, we compare the skin recognition performance yielded using the reflectance spectra recovered by our method as the feature for classification to those results yielded by the classifier using a number of alternative features. To this end, we present the results for two variants of our recovered reflectance, both estimated by the procedure described in Section 2.4. For the first variant, the ground-truth illuminant spectrum is supplied as input. For the second one, we use the estimated illuminant spectra obtained by the experiments in Section 5.1.1. By comparing the performance in these two cases, we can assess the robustness of the recovered reflectance when the estimated illuminant spectra is used as compared to the ground-truth. In addition, we also compare these variants with a number of alternatives. The first of these is the spectral reflectance obtained by normalising the raw image radiance spectra by the measured ground-truth illuminant. The second case is where the classifier is applied to the raw radiance spectra. Lastly, we use the principal components resulting from performing subspace projection via Linear Discriminant Analysis (LOA) on the original radiance spectra.

This experiment is performed on the face image database captured in the visible range described earlier. To obtain a training data-set, we select skin and non skin regions from an image captured under a light source placed in a high-oblique position in front of the subject. On average, there are 856 skin pixels and 7796 non-skin pixels selected from several regions in each image as training data. Subsequently, each of the features described above is extracted from each training set and used as input to a Support Vector Machine (SVM) classifier [13] with a Radial Basis Function (REF) kernel. In addition, the parameters are selected using 5-fold cross validation at training time. To classify skin versus non skin pixels, the resulting SVM model is applied to the test images of the same subject. The test images, each with a size of 340×400 pixels, have been acquired under other illuminant conditions.

Figure 18:
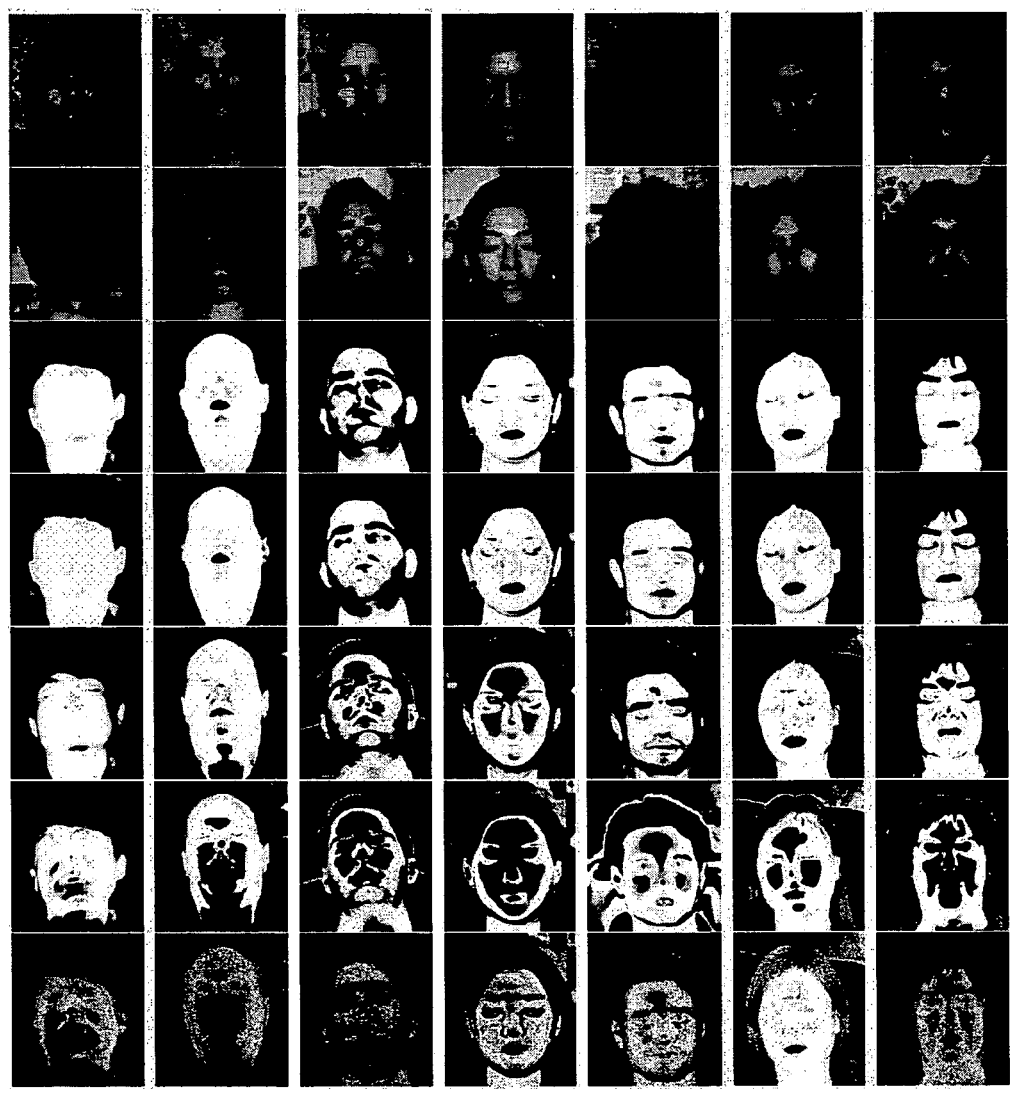
FIG. 18 shows skin segmentation results. Top row: sample training images for skin recognition, with labelled skin regions (with red borders) and non-skin regions (in blue borders). Second row: the test images of the corresponding subjects, captured under a different illumination direction. The third to last row are the skin probability map obtained using different features. Third row: obtained using the reflectance estimated given the ground-truth illuminant spectrum. Fourth row: yielded using the estimated reflectance after estimating the illuminant spectrum. Fifth row: yielded using the reflectance obtained by normalising radiance spectra by the ground-truth illuminant spectrum. Sixth row: yielded using the raw radiance of the input images. Seventh row: recovered making use of the top 20 LDA components of the raw radiance spectra.

In FIG. 18 we present the skin segmentation maps obtained using the input features described above. The top row shows the training images of a number of sample subjects, with skin training regions enclosed in red rectangular boundaries and non-skin training areas enclosed in blue rectangles. The second row, from top-to-bottom, shows the test images for the subjects in the top row.

Note that the illuminant directions and power spectra in the two rows differ, as can be observed in the shading and shadows. In fact, the training images are illuminated by the light source placed in a high-oblique position in front of the subjects whereas the test images are illuminated by a frontal light source with the same direction as the viewing direction. The bottom five rows are the skin probability maps yielded by the SMVs trained using the features described above. In the figure, lighter pixels are classified as being more likely to be skin. The third and fourth rows correspond to the variants of our recovered reflectance, with ground-truth illuminant and estimated illuminant spectra supplied as input, respectively. The fifth, sixth and seventh rows correspond to the reflectance obtained by normalising the image radiance by the ground-truth illuminant spectrum, the raw radiance and the top 20 LDA components of the image radiance spectra, respectively.

From FIG. 18, we can conclude that the skin reflectance spectra recovered by our method are, in fact, invariant to illuminant power and direction. This stems from the fact that the reflectance features delivered by our method yield the most visually accurate skin maps. In many cases, non-skin face details such as eyebrows and mouth are correctly distinguished from skin. Furthermore, the results of the two reflectance variants are in good accordance. This is due to the low difference between the estimated illuminant and the ground truth, which deviated typically between 1 and 3 degrees.

On the other hand, the reflectance features used for the results on the fifth row, although being illuminant invariant, still yield falsely classified skin pixels. The poor classification results obtained by these features can be explained by the variation induced by the illuminant spectrum and the surface geometry. This is evident at pixels near the face boundary and the highlight positions. This is expected in the fifth row since normalising radiance by illuminant power does not achieve geometry-independence and disregards the specular components inherent to the dichromatic the model. In contrast, our method achieves the recovery of the reflectance free of geometry and specularity artifacts. Thus it is able to recognise skin pixels at grazing angles and specular spikes. In addition, normalised raw radiance spectra and their LDA components, as employed for the classification on the sixth and seventh rows are not illuminant invariant. Therefore these cannot cope with the change in illumination between the training and test images. As shown in the last two rows, this results in much more false negatives in skin areas and false positives in other materials as compared to the reflectance features yielded by our method.

Figures 19, 20:
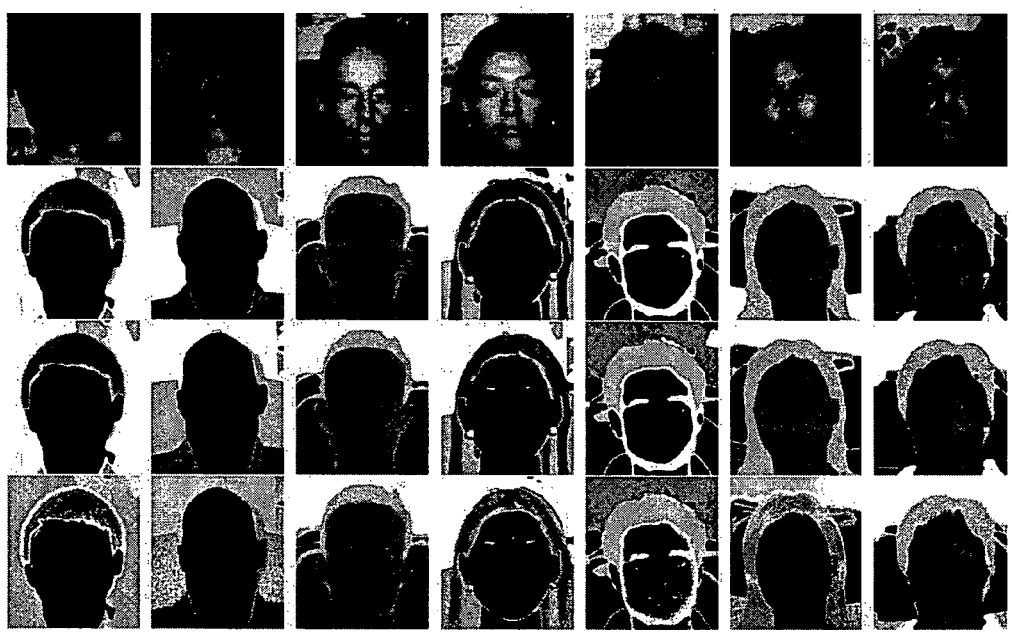
FIG. 19 shows Table 7 having accuracy of several skin pixel recognition methods, each using a different input reflectance-based feature for classification.
FIG. 20 graphically shows material clusters, with each material marked by a different shade of gray. Top row: A band of the input images, shown at 670 nm. Second row: material clustering maps, obtained with the clustering feature being the estimated reflectance given the ground-truth illuminant. Third row: material clustering maps resulting from the use of the reflectance feature recovered with an estimated illuminant spectrum as input. Fourth row: material clustering maps, using the reflectance obtained by normalising the input radiance image by the ground-truth illuminant spectrum.

In order to provide a quantitative analysis, in Table 7 of FIG. 19 we show the performance of the above skin segmentation schemes in terms of the classification rate (CR), the correct detection rate (CDR) and false detection rate (FDR). The correct detection rate is the percentage of skin pixels correctly classified. The false detection rate is the percentage of non-skin pixels incorrectly classified. The classification rate is the overall percentage of skin and non-skin pixels classified accurately. The table shows the segmentation accuracy measures over all the visible face images of all the subjects in the dataset illuminated by the frontal light source. The rows of the table correspond to the different skin classification features described earlier. As expected, the reflectance recovered by our method achieves the highest skin recognition rates. This is consistent with the qualitative results above. Furthermore, the overall performance difference between the two reflectance variants based upon our method, i.e. when the estimated and the ground-truth light spectrum are used, is less than 4%. This demonstrates the robustness of our reflectance estimation method to errors in the input illuminant spectrum. As before, the reflectance obtained by normalising radiance by illuminant power performs better than the raw radiance spectra and its LDA components. Again, the radiance feature and its LDA components yield the most false positives and negatives.

Next, we examine the utility of the spectral reflectance recovered by our algorithm for unsupervised material clustering on multispectral images. This experiment can be treated as an extension of the skin segmentation application. In addition, it is complementary to skin clustering algorithms using trichromatic features, which has been described elsewhere in the literature [44]. It also compares the clustering accuracy on the estimated reflectance to that on the measured (ground-truth) reflectance. Here, we perform a clustering algorithm based on a deterministic annealing approach [27] on the three reflectance features mentioned in the previous experiment. These features include the estimated reflectance estimated given the ground-truth illuminant spectrum, the estimated reflectance yielded from an estimated illuminant spectrum, and the reflectance obtained by normalising radiance spectra by the ground-truth illuminant spectrum. The clustering algorithm is initialised with a single cluster for all the materials. As the algorithm proceeds, new clusters are introduced by splitting existing ones containing different materials. Thus, the resulting number of clusters is data-dependent and does not need to be specified as input.

In FIG. 20, we show the clustering maps of the images of several human subjects, with each row corresponding to a reflectance feature. The resulting material clusters are marked with different shades of gray. In fact, there are a high level of similarity between the cluttering results yielded by the reflectance features estimated with the estimated illuminant spectrum and with the ground truth illuminant spectrum provided as input, as shown in rows 2 and 3. This demonstrates, again, the robustness of our reflectance estimation method to errors in the input illuminant spectrum. In these clustering maps, all the materials are well-separated from each other. Moreover, there are very few misclassified pixels within each cluster. On the faces, the skin pixels are clearly distinguished from the neighbouring regions. Notably, the background regions displaying printed faces, such as that in the third column, are correctly clustered as paper. This result demonstrates that the spectral variation of material reflectance is a better feature for classification than trichromatic colour. Note that using trichromatic imagery, it would have been virtually impossible to set apart materials with the same apparent color, such as real faces from printed ones. In the last row, we use the ground truth (measured) reflectance as feature for the clustering algorithm. Compared to our estimated reflectance, the measured reflectance produces noisier clustering maps, with pixels in some neighbourhoods assigned to various materials. In other words, our reflectance recovery method improves the clustering performance by reducing measurement noise in the raw reflectance spectra.

The above examples have shown how the illumination spectrum and photometric invariants of an image can be estimated. Using one or more of these estimates pre and post processing can be performed on the image.

Processing of the image includes, but is not limited to:

Image editing white balance re-illumination, such as colour manipulation to change an image from warm to cold, or change illumination spectrum of an image to change the illumination from daylight to sunlight, or sunlight to tungsten re-shading re-colouring, for example to change a black and white image to colour based on the properties of a known colour set or applying the reflective properties of one image to another light source re-positioning material modification highlight removal surface rendering material modification Shape estimation recovery of shape an object or scene captured in the image Material recognition or classification material, pattern or object recognition and classification Hardware calibration improve photometric calibration, such as of a camera that captured the image Processing of an image in this way could be included as a function available on a camera 200, or on a separate computer having software installed to process the image 202 after capture.

Applications of the methods described here include to the fields of digital photography, such as image editing manufacturing, such as quality and production control.

product analysis, such as determining whether a vehicle had been in an accident, and surveillance, such as face identification and tracking.

Where a hyperspectral camera is used, the application will often have the benefit of reducing the number of cameras needed to produce the same analysis, reducing the set up costs.

The spectral image can be converted to a colour band representation, such as RGB, and in that sense the methods described here can be used on colour images.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM)

and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for estimating an illumination spectrum of an image comprised of points of wavelength indexed spectral data, the method comprising:
  optimizing a cost function based on:
  (i) differences between the wavelength indexed spectral data and estimates based on a dichromatic reflection model for different dichromatic reflection model parameter values, wherein the dichromatic reflection model includes at least an illumination spectrum parameter, and
  (ii) a term to constrain model parameter values based on a robust kernel or curvature consistency.

2. The method of claim 1, wherein due to the term, the optimizing the cost function is solved in a closed form.

3. The method of claim 1, wherein the term is based on minimizing a variation of the gradient magnitude of shading or the curvature magnitude variation.

4. The method of claim 3, wherein the term is based on the gradient magnitude of the shading or the curvature magnitude as a measure of smoothness error.

5. The method of claim 1, wherein due to the term, optimizing the cost function is robust against outliers by providing a reduced bias to noise corruption and image acquisition errors as compared to a cost function based on only squares of differences.

6. The method of claim 5, wherein for each point, the kernel provides a bias that is based on the difference between a determined gradient magnitude of the shading of a point in the image and a determined gradient magnitude of shading of a local neighborhood of that point in the image.

7. The method of claim 5, wherein the further cost function is according to a method proposed by Finlayson & Schaefer.

8. The method of claim 1, wherein due to the term, errors in the wavelength indexed spectral data due to noise have reduced differences to the estimates based on the dichromatic model.

9. The method of claim 1, wherein the robust kernel renders the cost function robust against outliers in estimated surface normals on the image.

10. The method of claim 1, wherein the robust kernel is based on a Huber estimator, Tukey bi-weight function or Lee adaptive potential functions.

11. The method of claim 1, wherein the term constrains curvature of a point in the image to be similar to curvature of a local neighborhood of that point in the image.

12. The method of claim 1, wherein the term assigns a larger weight to points that belong to the same or similar shape or radiance in the image.

13. The method of claim 1, wherein the term is based on curvature induced by shading or radiance in the image.

14. The method of claim 1, wherein the term is based on limiting differences between one or more model parameters values between neighboring wavelengths.

15. The method of claim 1, wherein the cost function is in closed form due to a change of variable or the use of intermediate variables represent cost function.

16. The method of claim 1, wherein the method further comprises identifying the illumination spectrum parameter value that optimized the cost function as the estimate of the illumination spectrum of the image.

17. The method of claim 1, wherein the method further comprises using the estimated illumination spectrum of the image in further processing associated with the image, being one or more of:
  image editing;
  shape estimation;
  material recognition or classification; and
  hardware calibration.

18. A method of claim 1 wherein the illumination spectrum of the image is known, the method comprising:
  (a) for each point in the image, estimating surface reflectance of that point based on a dichromatic reflection model, the illumination spectrum and the wavelength indexed spectral data; and
  (b) for each point in the image, estimating the surface shading and specularity based on the wavelength indexed spectral data, the dichromatic reflection model, the illumination spectrum and estimated surface reflectance.

19. The method of claim 18, wherein step (h) comprises:
  for each point in the image, estimating the reflectance spectrum of that point based on the wavelength indexed spectral data of a local neighborhood of that point in the image; and
  fitting the wavelength indexed spectral data of each point of the image onto a subspace spanned by the illumination spectrum and the reflectance spectrum.

20. The method of claim 19, wherein step (b) further comprises minimizing the difference between the wavelength indexed spectral data and the subspace spanned by the illumination spectrum and the reflectance spectrum.

21. The method of claim 18, wherein step (a) of estimating surface reflectance of that point is based on the wavelength indexed spectral data of a local neighborhood of that point in the image, such that the local neighborhood exhibits slowly varying surface reflectance.

22. A method of claim 1, further comprising selecting sub-images of the image for use in estimating the illumination spectrum of the image the method comprising:
  (a) identifying multiple candidate sub-images of the image;
  (b) for each candidate sub-image, fitting a hyperplane based on a dichromatic reflection model to the wavelength indexed spectral data of the candidate sub-image; and
  (c) selecting candidate sub-images having wavelength indexed spectral data that does not deviate from fitting the hyperplane by more than a determined amount.

23. The method of claim 2, wherein step (c) further comprises selecting subimages also having a high contrast based on a variance of the mean wavelength indexed spectral data over the wavelengths.

24. The method of claim 22, wherein the determined amount of step (c) are candidate sub-images that have a determined percentage of wavelength indexed spectral data that does not deviate from the hyperplane.

25. The method of claim 22, wherein step (b) comprises fitting a radiance vector representation of the wavelength indexed spectral data.

26. The method of claim 1, wherein the image is a trichromatic, hyperspectral or multispectral image.

27. The method of claim 1 wherein the cost function is iteratively optimized and the illumination spectrum parameter value is initialized with a uniform illumination spectrum or based on a solution of a further cost function based on only the differences.

28. A computer implemented method is provided for estimating an illumination spectrum of an image comprised of points of wavelength indexed spectral data, the method comprising:
   (a) selecting sub-images of the image for use in estimating the illumination spectrum of the image by:
      (i) identifying multiple candidate sub-images of the image;
      (ii) for each candidate sub-image, fitting a hyperplane based on a dichromatic reflection model to the wavelength indexed spectral data of the candidate sub-image; and
      (iii) selecting candidate sub-images having wavelength indexed spectral data that does not deviate from fitting the hyperplane by more than a determined amount; and
   (b) using only the selected sub-images, estimating the illumination spectrum by optimizing a cost function based on differences between the wavelength indexed spectral data and estimates based on a dichromatic reflection model for different dichromatic reflection model parameter values, wherein the dichromatic reflection model includes at least an illumination spectrum parameter, and one or more of:
      (i) a term to constrain model parameter values based on a robust kernel or curvature consistency; and
      (ii) the differences being determined by fitting the wavelength indexed spectral data to a hyperplane of the dichromatic reflection model when the hyperplane constrains illumination spectrum parameter values, and a term to constrain model parameter values; and
      (iii) a term to constrain model parameter, wherein the cost function is iteratively optimized and the illumination spectrum parameter value is initialized with a uniform illumination spectrum or based on a solution of a further cost function based on only the differences.

29. A non-transitory computer readable medium storing computer executable instructions that when executed by a computer cause the computer to perform the method of claim 1 or 28.

30. A computer comprising a processor operable to perform the method of claim 1, or 28.

* * * * *

UNITED STATES PATENT AND TRADEMARK OFFICE
CERTIFICATE OF CORRECTION

Page 1 of 2

PATENT NO. : 9,087,266 B2
APPLICATION NO. : 13/394094
DATED : July 21, 2015
INVENTOR(S) : Antonio Robles-Kelly and Cong Phuoc Huynh It is certified that error appears in the above-identified patent and that said Letters Patent is hereby corrected as shown below:

In the Specification:

Column 10, Line 26 Should Read As Follows:

Bertian surface, we have $g(u) = \cos(\overline{n(u)}, \overline{L})$, i.e. the cosine of Column 10, Line 42 Should Read As Follows:
$I(\lambda, u)$ to the dichromatic model to recover the parameters $g(u)$, Column 11, Line 17 Should Read As Follows:
surface patch P Î $I$ and write Column 13, Line 15 Should Read As Follows:

where the diffuse radiance vector $D_P^{r-1} = L^{r-1} \bullet S_P$ is the com-

Column 13, Line 53 Should Read As Follows:
so as to obtain the scalars $\tau_1(u), \tau_2(u)$ (see FIG. 21, 100(b))

Column 16, Equation (15) Should Read As Follows:

$$L^*(\lambda_i) = \frac{\sum_{P \in P} \sum_{u \in P} k'(u) I(\lambda_i, u) - \sum_{P \in P} \left[ \frac{\left(\sum_{u \in P} g'(u) k'(u)\right)\left(\sum_{u \in P} g'(u) I(\lambda_i, u)\right)}{\sum_{u \in P} (g'(u))^2} \right]}{\sum_{P \in P} \sum_{u \in P} (k'(u))^2 - \sum_{P \in P} \left[ \frac{\left(\sum_{u \in P} g'(u) k'(u)\right)^2}{\sum_{u \in P} (g'(u))^2} \right]}$$

Column 20, Line 25 Should Read As Follows:
and $\Omega$ is the spectrum of the incoming light. Furthermore, it is Signed and Sealed this
Twelfth Day of April, 2016

Michelle K. Lee
*Director of the United States Patent and Trademark Office*

CERTIFICATE OF CORRECTION (continued)
U.S. Pat. No. 9,087,266 B2

In the Claims:

Column 32, Line 11, Claim 15 Should Read as Follows:
        mediate variables to represent cost function.

Column 32, Line 35, Claim 19 Should Read As Follows:
        The method of claim 18, wherein step (b) comprises:

Column 32, Line 64, Claim 23 Should Read As Follows:
        The method of claim 22, wherein step (c) further com-